US009754116B1

(12) United States Patent
Roth et al.

(10) Patent No.: US 9,754,116 B1
(45) Date of Patent: Sep. 5, 2017

(54) WEB SERVICES IN SECURE EXECUTION ENVIRONMENTS

(71) Applicant: Amazon Technologies, Inc., Reno, NV (US)

(72) Inventors: Gregory Branchek Roth, Seattle, WA (US); Aaron Douglas Dokey, Seattle, WA (US); Eric Jason Brandwine, Haymarket, VA (US); Nathan Bartholomew Thomas, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/476,600

(22) Filed: Sep. 3, 2014

(51) Int. Cl.
| | |
|---|---|
| *H04L 9/00* | (2006.01) |
| *G06F 21/62* | (2013.01) |
| *G06F 21/60* | (2013.01) |
| *G06F 21/71* | (2013.01) |
| *G06F 21/57* | (2013.01) |

(52) U.S. Cl.
CPC ............ *G06F 21/602* (2013.01); *G06F 21/71* (2013.01); *G06F 21/57* (2013.01); *G06F 21/6218* (2013.01)

(58) Field of Classification Search
CPC ........ G06F 21/602; G06F 21/71; G06F 21/57; G06F 21/6218
USPC ..... 713/153, 164, 168, 175, 176; 726/22, 26
See application file for complete search history.

(56) References Cited

U.S. PATENT DOCUMENTS

| 4,218,582 A | 8/1980 | Hellman et al. |
| 4,405,829 A | 9/1983 | Rivest et al. |
| 5,643,085 A | 7/1997 | Aityan et al. |
| 5,643,086 A | 7/1997 | Alcorn et al. |
| 5,666,533 A | 9/1997 | Horiguchi et al. |
| 5,848,159 A | 12/1998 | Collins |

(Continued)

FOREIGN PATENT DOCUMENTS

WO    WO2008118648    10/2008

OTHER PUBLICATIONS

Hoekstra, M., "Intel® SGX for Dummies (Intel® SGX Design Objectives)," <https://software.intel.com/en-us/blogs/2013/09/26/protecting-application-secrets-with-intel-s . . . > [retrieved Sep. 3, 2014], 4 pages.

(Continued)

*Primary Examiner* — Alexander Lagor
(74) *Attorney, Agent, or Firm* — Davis Wright Tremaine LLP

(57) ABSTRACT

Techniques for operating web services within secure execution environments running within computing resource service provider environments are described herein. A web service provides an application that can be instantiated within a secure execution environment associated with a customer computer system that is hosted by a computing resource service provider and programmatically managed by the customer and the customer computer system provides validation of the secure execution environment. Web service requests from the customer computer system are received by the web service application hosted within the secure execution environment. As the one or more web service requests are received by the web service within the secure execution environment, the requests are fulfilled by executing instructions associated with the web service within the secure execution environment.

20 Claims, 11 Drawing Sheets

(56) References Cited

U.S. PATENT DOCUMENTS

| | | | |
|---|---|---|---|
| 5,867,578 | A | 2/1999 | Brickell et al. |
| 5,905,799 | A | 5/1999 | Ganesan |
| 6,071,190 | A | 6/2000 | Weiss et al. |
| 6,237,097 | B1 | 5/2001 | Frankel et al. |
| 6,364,796 | B1 | 4/2002 | Nakamura et al. |
| 6,631,354 | B1 | 10/2003 | Leymann et al. |
| 6,722,986 | B1 | 4/2004 | Lyons et al. |
| 6,834,272 | B1 | 12/2004 | Naor et al. |
| 7,063,615 | B2 | 6/2006 | Alcorn et al. |
| 7,917,747 | B2 | 3/2011 | Wolf |
| 8,291,468 | B1 | 10/2012 | Chickering |
| 8,407,584 | B1 | 3/2013 | Broodman et al. |
| 8,473,754 | B2 | 6/2013 | Jones et al. |
| 8,478,977 | B1 | 7/2013 | Smith et al. |
| 8,694,795 | B1 | 4/2014 | Aissi |
| 9,116,733 | B2 | 8/2015 | Banga et al. |
| 9,154,479 | B1 | 10/2015 | Sethi |
| 9,246,690 | B1 | 1/2016 | Roth et al. |
| 9,491,111 | B1 | 11/2016 | Roth et al. |
| 2002/0184046 | A1 | 12/2002 | Kamada et al. |
| 2003/0233544 | A1 | 12/2003 | Erlingsson |
| 2004/0176068 | A1 | 9/2004 | Paatero |
| 2005/0091535 | A1 | 4/2005 | Kavalam et al. |
| 2005/0278418 | A1 | 12/2005 | Rathakrishnan et al. |
| 2006/0161887 | A1 | 7/2006 | Krishnaswamy et al. |
| 2007/0005992 | A1 | 1/2007 | Schluessler et al. |
| 2007/0050763 | A1 | 3/2007 | Kagan et al. |
| 2007/0153715 | A1 | 7/2007 | Covington et al. |
| 2007/0206799 | A1 | 9/2007 | Wingert et al. |
| 2008/0216071 | A1 | 9/2008 | Gidalov |
| 2009/0112359 | A1 | 4/2009 | Sanguinetti |
| 2009/0313406 | A1 | 12/2009 | Suh et al. |
| 2010/0031325 | A1 | 2/2010 | Maigne et al. |
| 2010/0077473 | A1 | 3/2010 | Ohta et al. |
| 2011/0179468 | A1 | 7/2011 | Adams et al. |
| 2012/0084838 | A1 | 4/2012 | Inforzato et al. |
| 2012/0144457 | A1 | 6/2012 | Counterman |
| 2012/0159184 | A1 | 6/2012 | Johnson et al. |
| 2012/0192177 | A1 | 7/2012 | Tsirkin |
| 2013/0007239 | A1 | 1/2013 | Agarwal et al. |
| 2013/0117561 | A1* | 5/2013 | Chawla .................. H04L 29/06 713/158 |
| 2013/0151846 | A1 | 6/2013 | Baumann et al. |
| 2013/0174150 | A1 | 7/2013 | Nakajima |
| 2013/0174151 | A1 | 7/2013 | Nakajima |
| 2013/0179682 | A1 | 7/2013 | Ramachandran et al. |
| 2013/0198853 | A1 | 8/2013 | McKeen et al. |
| 2013/0227286 | A1 | 8/2013 | Brisson |
| 2013/0246778 | A1 | 9/2013 | Nikara et al. |
| 2013/0282776 | A1 | 10/2013 | Durrant et al. |
| 2013/0312117 | A1 | 11/2013 | Sapp, II et al. |
| 2013/0318343 | A1 | 11/2013 | Bjarnason et al. |
| 2013/0318577 | A1 | 11/2013 | Bulusu et al. |
| 2013/0326504 | A1 | 12/2013 | Tsirkin et al. |
| 2014/0051432 | A1 | 2/2014 | Gupta et al. |
| 2014/0075496 | A1 | 3/2014 | Prakash et al. |
| 2014/0105393 | A1 | 4/2014 | Kolesnikov |
| 2014/0181359 | A1 | 6/2014 | Zhang et al. |
| 2014/0201841 | A1 | 7/2014 | Deshpande et al. |
| 2014/0205099 | A1 | 7/2014 | Christodorescu et al. |
| 2014/0223543 | A1 | 8/2014 | Jeansonne et al. |
| 2014/0282935 | A1 | 9/2014 | Lal et al. |
| 2014/0283098 | A1 | 9/2014 | Phegade et al. |
| 2014/0317686 | A1 | 10/2014 | Vetillard |
| 2014/0325515 | A1 | 10/2014 | Salmela et al. |
| 2014/0331317 | A1 | 11/2014 | Singh |
| 2014/0351583 | A1 | 11/2014 | Bettale et al. |
| 2014/0373012 | A1 | 12/2014 | Ylitalo et al. |
| 2015/0007175 | A1 | 1/2015 | Potlapally et al. |
| 2015/0058629 | A1 | 2/2015 | Yarvis et al. |
| 2015/0127834 | A1 | 5/2015 | Udupi et al. |
| 2015/0143347 | A1 | 5/2015 | Jones et al. |
| 2015/0143374 | A1 | 5/2015 | Banga et al. |
| 2015/0143375 | A1 | 5/2015 | Bruso et al. |
| 2015/0199509 | A1 | 7/2015 | Wille |
| 2015/0200948 | A1 | 7/2015 | Cairns et al. |
| 2015/0244716 | A1 | 8/2015 | Potlapally et al. |
| 2015/0254451 | A1 | 9/2015 | Doane et al. |
| 2015/0278528 | A1 | 10/2015 | Xing et al. |
| 2015/0356462 | A1 | 12/2015 | Fawaz et al. |
| 2016/0088009 | A1 | 3/2016 | Gupta et al. |

OTHER PUBLICATIONS

Hoekstra, M., "Intel® SGX for Dummies—Part 2," <https://software.intel.com/en-us/blogs/2014/06/02/intel-sgw-for-dummies-part-2> [retrieved Sep. 3, 2014], 3 pages.

Hoekstra, M., "Intel® SGX for Dummies—Part 3," <https://software.intel.com/en-us/blogs/2014/09/01/intel-sgw-for-dummies-part-3> [retrieved Sep. 3, 2014], 3 pages.

"Intel® Software Guard Extension Programming Reference," Intel®, Reference No. 329298-001US, Sep. 2013, 156 pages.

McKeen, F., et al., "Innovative Instructions and Software Model for Isolated Execution," Proceedings of the 2nd International Workshop on Hardware and Architectural Support for Security and Privacy, Jun. 23-24, 2013, Tel-Aviv, Israel, pp. 1-8.

Goldreich et al., "How to Play Any Mental Game," In Proceedings of the Nineteenth Annual ACM Symposium on Theory of Computing (STOC '87), Alfred V. Aho (Ed.). ACM, New York, NY, USA, pp. 218-229, 1987.

* cited by examiner

WEB SERVICES IN SECURE EXECUTION ENVIRONMENTS

BACKGROUND

Modern computer systems place a high importance on maintaining data and application security. In a modern distributed and/or virtual computer system environment, where a plurality of users, services, applications, virtual machines, controlling domains and hosts may have access to a computer system, maintaining data and application security may be a difficult problem. In a distributed and/or virtual computer system environment, for example, where the computer system resources may be provided by a computing resource service provider, customers may also wish for additional security for sensitive or restricted data, protecting such data even from the computing resource service provider.

Encrypting data or applications may help ameliorate the security concerns, but users often desire additional assurances. For example, users may desire additional assurances that malicious applications are unable to temporarily obtain trusted status on a host machine, thereby gaining access to encryption keys and thus compromising encryption security. Similarly, a controlling domain or operating system may always have trusted status and may also read or write directly from computer system memory. Accordingly, users may desire assurances of the security of their data and applications operating within a computing resource service provider environment, event against discovery by the computing resource service provider. Similarly, computing resource service providers may wish to securely locate sensitive or proprietary data or applications within computer systems with assurances that such data or applications are not accessible by privileged customer users and applications on such computer systems.

BRIEF DESCRIPTION OF THE DRAWINGS

Various embodiments in accordance with the present disclosure will be described with reference to the drawings, in which.

DETAILED DESCRIPTION

Figure 1:
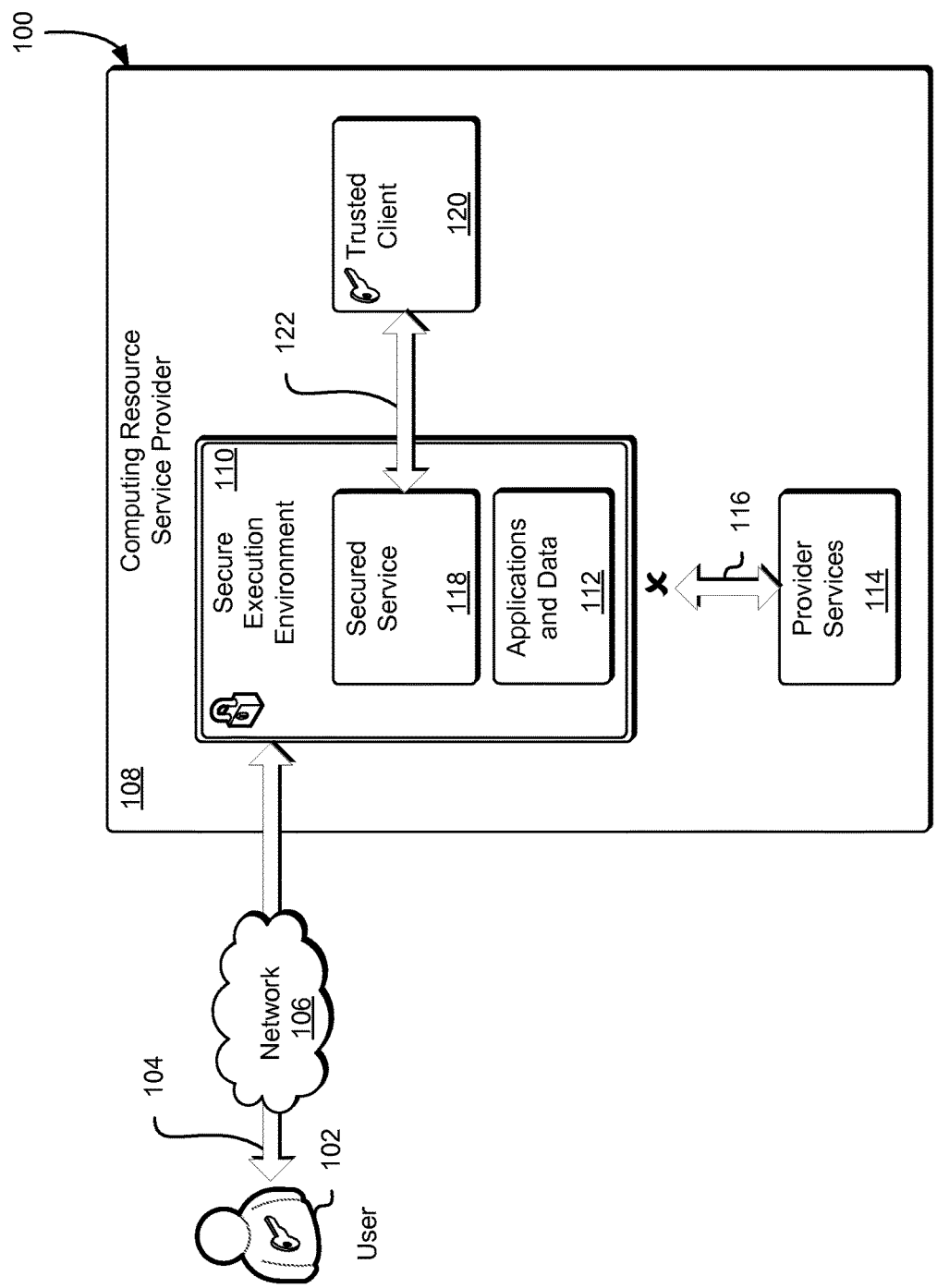
FIG. 1 illustrates an example environment where users may connect to a secured service within a secure execution environment in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, processes, and methods for providing access to services operating within secure execution environments (such as enclaves, discussed below). A computing resource service provider provides computer resources as a service such that the computer resources are remotely and programmatically managed by customers of the computing resource service provider. The computing resource service provider also allows customers to configure and control access to services operating within those computer resources. In some examples, the computer resources are virtual computer systems that are programmatically managed by a customer of the computing resource service provider. A computing resource service provider also may allow customers to configure secure execution environments and may allow customers to configure services to operate within those secure execution environments (referred to as "secured services"). Such secured services (i.e., services running within secure execution environments) or portions of such secured services may be configured to receive service requests (requests to access a service) from trusted clients which may be signed by access keys provided by the secure execution environment. The requests may be, for example, web service requests. Requests with validated signatures may be processed by the secured services within the secure execution environment, thus protecting the details of the processing of the requests from examination by other computer system entities. The secured services provided by the computing resource service provider may be implemented on hardware of the computing resource service provider, in a secure execution environment (a specific example of which is an "enclave") supported by the hardware.

A service or portion of a service may be instantiated within a secure execution environment that is within a computer system environment provided by a computing resource service provider. Applications such as web services and/or data associated with such applications may also be instantiated within that secure execution environment. An application running within that secure execution environment or an application running on the computer system may initiate a connection with a service provided by a computing resource service provider, which may provide an attestation (or validation) of that secure execution environment. A client may generate requests (e.g., web services requests) to the secured service running within the secure execution environment. The requests may be submitted, for example, to enable other requests for resources which may be provided by the computing resource service provider to be submitted. A request may be submitted to the secured services that may cause the secured service to digitally sign another request that may then be forwarded to a web server of a service of the computing resource service provider. For example, a web services request for access to resources provided by a data storage service may be sent from a client application to a secured web service, and the secured web service may validate the web request and generate a second request for the resources to another computing resource service provider service.

The requests to the secured services may be fulfilled by the secured services running within the secure execution environment. The requests may be received by a secured service, such as a secured web service, which may be configured to receive and/or process such requests. In some embodiments, processing such requests may include performing one or more preprocessing operations before processing the requests. Preprocessing operations may be operations to prepare the requests for processing by other applications within a computer system. Preprocessing operations may include operations such as signing a request with security credentials (e.g., a cryptographic key, a password, a certification or other security credentials), encrypting a request, preparing a request for storage in a storage device, preparing a request for storage within a database, decrypting a request, preparing a request for transmission over a secure network connection (e.g., an encrypted, firewalled, private, virtual private and/or other secure network connection) and/or other preprocessing operations.

A service provided by a computing resource service provider may be securely installed within the secure execution environment such that the code associated with the service may be inaccessible to privileged entities operating within the programmatically controlled customer computer system. Such secured services may be instantiated within any domain that is configured to securely execute such services on that domain. A secured service may be instantiated by accessing a provider service (referred to herein as a "compute service"). The computing resource service provider may provide access to the compute service by exposing, for example, a web interface configured to receive secure execution environment instantiation requests. In response, the compute service may be configured to receive instantiation requests and may also be configured to locate suitable domains where such a service may be securely instantiated. When a suitable host environment is located, a secured service may be instantiated by the compute service within a secure execution environment operating within the host environment. A secured service within a secure execution environment may be instantiated on a computer system by sending a request (referred to herein as a "provisioning request") specifying how the secured service may be configured, how the secure execution environment may be configured and/or how and where they may be instantiated.

A secure execution environment may be configured to permit applications internal to the secure execution environment to access the contents of the secure execution environment and to prevent applications external to the secure execution environment from accessing the contents of the secure execution environment. For example, a secure execution environment may be configured such that, even privileged applications of a virtualization platform may not access the secure execution environment contents. Memory writes within the secure execution environment may be encrypted using a cryptographic key protected by the secure execution environment so that the memory contents may not be read or otherwise accessed by applications outside of the secure execution environment due to the encryption of memory. The secure execution environment may be configured to prevent access to unencrypted secure execution environment data (i.e., data resident within the secure execution environment) by any applications external to the secure execution environment by automatically encrypting any data stored within the secure execution environment. Additionally, any data that exits the secure execution environment may be cleansed of any metadata that may refer to the memory addresses within the secure execution environment, thus preventing external software from determining the location of secure execution environment-protected data in computer system memory.

In some embodiments, customers are able to verify that a secure execution environment remains in a valid state and that, for example, unauthorized code has not been introduced into the secure execution environment. The service provider may, through the web interface, provide access to a secure execution environment's ability to provide remote attestation as to the state of the secure execution environment. For example, the secure execution environment may have a set of functions that, when executed by a processor, provide a cryptographically verifiable measurement (a "cryptographic measurement") indicating the current state of executable code and/or data within the secure execution environment. The cryptographically verifiable measurement may be rooted in a root of trust separate and protected from outside entities. That is, the secure execution environment may have cryptographic keys resident within the secure execution environment for digitally signing data output from the secure execution environment, and, by verifying the digital signature, applications external to the secure execution environment may be configured to trust the output data. In this manner, customers can verify the security of data and code in the secure execution environment.

A secured service may be instantiated on a computer system (such as a virtual machine and/or a host computer system) within one or more available environments. For example, a secured service may be instantiated within a computer system that may be controlled by a customer of the computing resource service provider and that may be provided by the computing resource service provider. A secured service may also be instantiated within a computer system that may be provided by a third party to the computing resource service provider such as the customer and/or another third party. Secured services may be configured to perform one or more operations associated with the computing resource service provider service. For example, a secured service may be configured to receive and/or execute executable instructions. A secured service may also be configured to receive source code from the computing resource service provider which may be compiled and/or interpreted on the computer system that provides the secure execution environment. Secured services may also be configured to receive data, metadata, and/or other information from the computing resource service provider and may then execute instructions to process such information. Secured services may also be configured to migrate at least a part of the functionality associated with a client application and/or associated with the service application into the secure execution environment.

When a secure execution environment is created by the provider for the customer, the customer may receive an access key which may control access to the secure execution environment but which may not, in some embodiments, allow examination of the contents of the secure execution environment. Data (e.g., executable code for a secured service) may be installed in the secure execution environment and applications may be instantiated to run within the secure execution environment. Entities outside of the secure execution environment may not access data stored in the secure execution environment, data sent to applications within the secure execution environment, the execution of the applications within the secure execution environment, the output of the applications within the secure execution environment or any other data and/or applications within the secure execution environment, while such data and/or applications remain within the secure execution environment. Data and/or results of applications may be accessed only if they are sent out from the secure execution environment and may be encrypted and/or cleansed of any identifying information prior to being sent out using one or more encryption keys. The encryption keys (and any corresponding decryption keys) may be made available to a user or process with proper credentials associated with the secure execution environment.

FIG. 1 illustrates an example environment 100 where users may connect to a secure execution environment running within a computing resource service provider environment in accordance with at least one embodiment. A user 102 may connect 104 to a secure execution environment 110 running within a computer system environment provided by a computing resource service provider 108. The user 102 may connect 104 to the secure execution environment 110 using a network 106. The connection used to connect 104 to the secure execution environment 110 may be authenticated (e.g., by being transmitted with a digital signature of the request). The user 102 may be a person, or may be a process running on one or more remote computer systems, or may be a computer system client or may be another computer system entity. A user 102 may issue a command such as an application programming interface ("API") command to instantiate a secured service 118 within a secure execution environment 110. As a result of the API request a provisioning request may be sent to request that the secured service 118 may be instantiated within the secure execution environment 110, the secure execution environment located within the computing resource service provider 108.

The secured service 118 may be a complete service, or may be a portion of a service. For example, a computing resource service provider may instantiate a service endpoint of a secured service, which may be configured to provide a part of the functionality of the secured service. The service endpoint may be configured to receive requests from clients of the service and perform one or more preprocessing operations on those requests to increase the speed, efficiency, and/or security of the service. The service endpoint may have a corresponding set of components operating outside of the secure execution environment including, but not limited to, load balancers, routers or other such components configured to receive and/or process a request. In some embodiments, the service endpoint of a service may be accessible by a network address (e.g., Internet Protocol (IP) address) assigned to a component of a service that is implemented outside of the secure execution environment. Such a component may receive requests and at least partial fulfillment of the request may be fulfilled by the service endpoint inside of the secure execution environment by, for instance, communication between the service endpoint and the component outside of the secure execution environment.

The service endpoint that is secured within the secure execution environment may be configured to validate requests and forward the validated requests to the service, thereby allowing the requests to bypass any validation processes that the service might typically perform. In this example, the client may generate a request and the request may be transmitted to the service endpoint using a plurality of, for example, routing components and may then be transmitted to the service for further fulfillment using a plurality of other such service endpoint components.

The service endpoint may also be configured to route requests to other services that may be configured to perform one or more preprocessing operations. The service endpoint may also be configured to perform a portion of the data processing associated with a request such as, for example, performing routing of information to the designated locations associated with the service. The service endpoint may also be configured to receive an update from the service in response to changes in the service functionality and, as the service endpoint may operate as a preprocessor to the service, the update may be applied automatically, thereby providing the changed service functionality to clients of the service. The service endpoint may be a web service endpoint (i.e., configured with a network address that may be determined from a uniform resource identifier or a uniform resource locator). As may be contemplated, the examples of the functionality provided by the service endpoint described herein are illustrative examples and other such functionality provided by the service endpoint may be considered as within the scope of the present disclosure.

The location of the secure execution environment 110 may be chosen based at least in part on the ability to support the secured service 118 within the secure execution environment 110. A user 102 that instantiates the secured service 118 may receive an access key as described herein. One or more trusted clients such as the trusted client 120 may also be provided with access (e.g., provided with an access key) to the secured service 118 and may, as a result, be configured to make one or more service requests (e.g., web service requests) to the secured service 118 within the secured execution environment. For example, a trusted client 120 may make service requests using the provided access key and the requests, if validated by the secured service 118, may be processed by the secured service.

The provisioning request may include a specification for capabilities (e.g., hardware capabilities) that may indicate a host suitable environment for instantiating a secure execution environment. The suitable host environment may be located based on host availability, level of security desired, and/or other factors. For example, a provisioning request may specify a minimum level of security (also referred to herein as a "level of assurance") required in order to instantiate the secure execution environment. A level of assurance is a measure of the level of security of a host environment that may be provided by a particular computer system, based on the hardware, software, and/or firmware that may be made available to that computer system. A provisioning request may also include data and/or metadata associated with the configuration of a secure execution environment. A provisioning request may be issued as a request to a service such as a compute service (e.g., a web service request), an API call, a library call, or a combination of these and/or other request types. The placement of any computer system resources associated with the provisioning request may be performed by a placement service of the computing resource service provider.

The secure execution environment 110, in an embodiment, provides functionality to securely store sensitive data or applications by providing a hardware-secured region within a host 136 where data may be stored and applications may be executed, but such data and applications may not be accessible outside of the secure execution environment. Hardware within the host 136 ensures that data stored within a secure execution environment and applications running within a secure execution environment are not accessible to any entity outside of the secure execution environment. In some embodiments, the secure execution environment 110 may be configured using dedicated hardware which may implement a variety of security assurance methods such as microcode instructions on a central processing unit, a trusted platform module, or other security assurance methods.

Trusted users and services may access the secure execution environment in order to use secure execution environment functionality. A user, client, service, process, application, module, or other entity with access to a service and/or access to the resources served by that service may use that secure execution environment functionality to further secure data and/or applications associated with that service. Trusted users and services may have the ability to create secure execution environments, populate secure execution environments with data and/or applications, obtain keys for decrypting results from secure execution environments, measure secure execution environments, start applications within secure execution environments, retrieve data from secure execution environments and utilize other secure execution environment functionality.

Secure execution environment functionality available to customers of the service provider may include functionality to create secure execution environments, destroy secure execution environments, measure (gather metrics from) secure execution environments, populate secure execution environments, generate keys, send data, receive data and/or other functionality. Functionality of a service endpoint implemented inside of a secure execution environment may also include functionality to monitor resources within a secure execution environment using, for example, a resource monitor configured to monitor resource usage and generate requests for additional resources to be provided to the secure execution environment based on changes in resource demands as indicated by the monitored resource usage. Access to such secure execution environment functionality may be provided by a library, interface, webservice, application programming interface request (an "API request") or another access methodology. With access to the interface, a computing resource service provider may provide that access to a user of a computer system as described herein. As may be contemplated, the providers of secure execution environment functionality, the types of secure execution environment functionality and the methods of providing access to secure execution environment functionality described herein are merely illustrative examples and, as such, other providers of secure execution environment functionality, types of secure execution environment functionality and methods of providing access to secure execution environment functionality may be considered as within the scope of the present disclosure.

In an illustrative example, a host computer system may provide secure execution environment functionality via the Intel® Software Guard Extensions (referred to herein as "Intel® SGX" or more simply as "SGX") that may be enabled on the central processing unit ("CPU") of the host computer system, although the scope of the present disclosure extends to other such secure execution environment types. A controlling domain may be running on that host computer system and may manage one or more virtual machine ("VM") instances also running on that host computer system. An application or process running on the host computer system may provide an interface to the secure execution environment functionality. A user, client, service, or module with access to a VM instance on the host computer system may use that interface to the secure execution environment functionality to perform secure execution environment operations such as operations to create a secure execution environment and/or populate the secure execution environment with one or more computer system services.

Provider services 114 may also be restricted from accessing the secure execution environment 110, the applications and data 112 and/or the secured service 118 operating therein if such provider services 114 are not trusted by the secure execution environment. Provider services 114 may be restricted from accessing the secure execution environment 110, the applications and data 112 and/or the secured service 118 operating therein. Provider services 114 which may be restricted from accessing the secure execution environment 110, the applications and data 112 and/or the secured service 118 operating therein may be operating on the same host machine as the secure execution environment 110 or may be operating on a different host machine than the host machine where the secure execution environment 110 is operating. In some embodiments, provider services 114 may have permission to perform a subset of activities or commands in connection with the secure execution environment 110 in accordance with one or more system policies. In some embodiments, provider services 114 may be restricted from all access to the secure execution environment 110, may also be restricted from all access to the applications and data 112 stored within the secure execution environment 110 and may also be restricted from all access to the secured service 118 operating within the secure execution environment 110.

A host may provide secure execution environment functionality to other applications operating within the host computer system, via instructions enabled on the CPU of the host computer system. Secure execution environment functionality may be provided to the host 136 by a specialized instruction set such as Intel® SGX extensions, by a module such as a trusted platform module ("TPM"), system microcode or by combinations of these and/or other provisions. A secure execution environment provided by a service such as a compute service may be provided on a selected computer system which supports such specialized instruction sets. In some embodiments, a secure execution environment may be provided as a service by selecting the host 136 from a plurality of candidate systems which may be configured to support secure execution environment functionality. In such embodiments, the host 136 may be selected from a plurality of computer systems which may provide the hardware capabilities and/or the level of assurance required for the secure execution environment. The host 136 may also be selected using secondary selection criteria associated with the computer system, including resource availability, proximity to users and/or other secondary selection criteria.

The secure execution environment functionality may be provided to applications running within the secure execution environment 110 on the host. For example, a virtual computer system service running on the host may access the secure execution environment functionality to provide that functionality to VM instances running under control of a virtual computer system service. Similarly, other services may include block-level data storage services, cryptography services, on-demand data storage services, notification services, authentication services, policy management services, task services and/or other services may also access the secure execution environment functionality to provide that functionality resources associated with those services. In some embodiments, secure execution environment functionality may also be provided to one or more customers of the computing resource service provider. A user with access to a service and/or access to the resources served by that service may use that secure execution environment functionality to further secure data and/or applications associated with that service. In an illustrative example, a virtual computer system service as described herein and/or a VM instance associated with that virtual computer system service may use the secure execution environment functionality to create a secure execution environment, populate that secure execution environment with data and/or applications, obtain keys for decrypting results from the secure execution environment, start the applications within the secure execution environment and receive updates.

Secure execution environment functionality may be provided to one or more other services within the computing resource service provider and/or to one or more customers of the computing service resource provider using a variety of techniques. For example, as described herein, in response to a request to create a secure execution environment from a customer, a secure execution environment may be created and may be initially populated with executable code which may be configured as an agent to provide access to secure execution environment functionality. The agent may be an application, module, process and/or the like which may be configured to instantiate other applications within the secure execution environment, may be configured to provide security keys from the host computer CPU, may be configured to locate other resources within the computer system or may be configured to perform other functionality.

Figure 2:
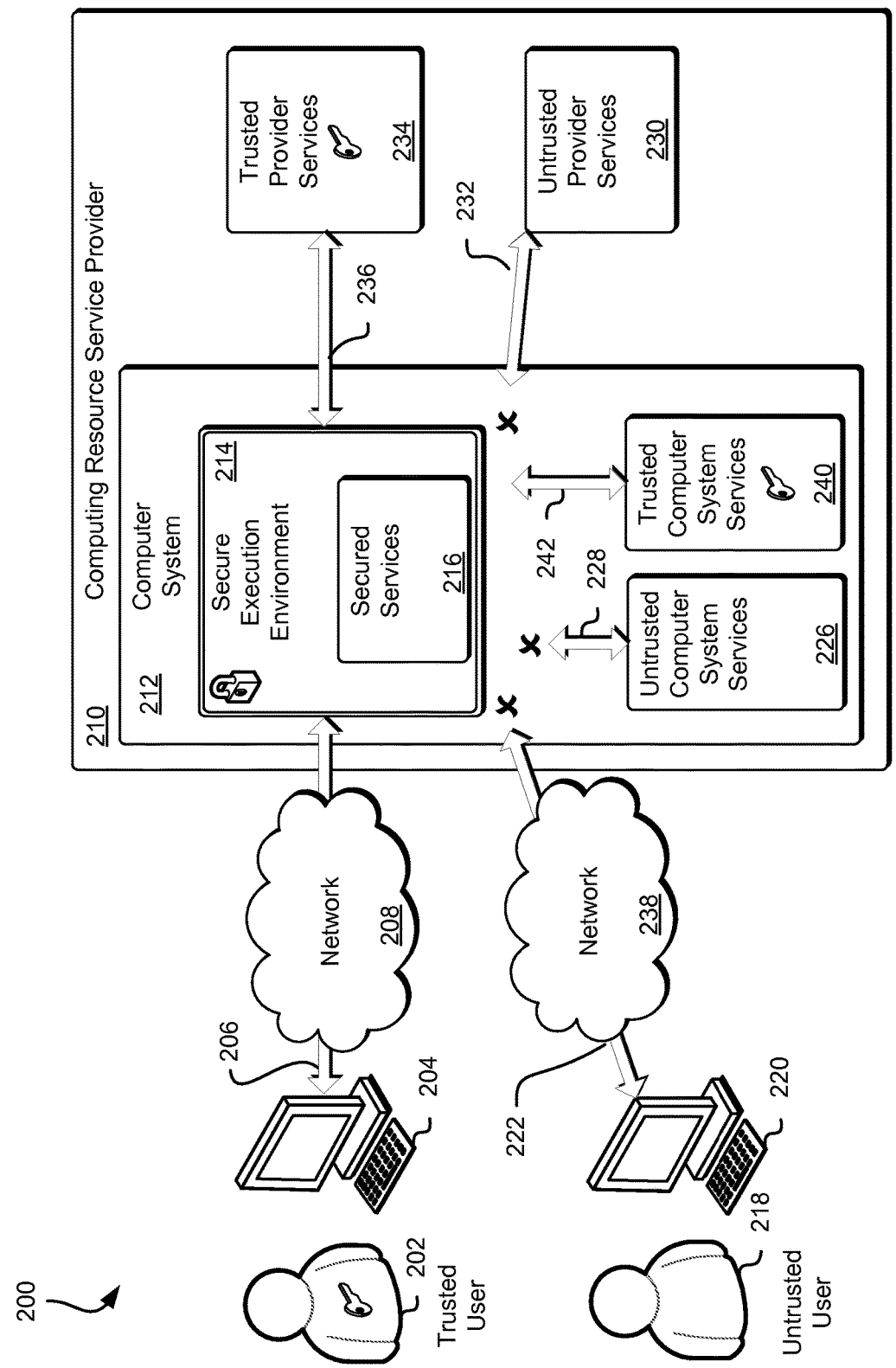
FIG. 2 illustrates an example environment where secured services may be accessed within a secure execution environment in accordance with at least one embodiment.

FIG. 2 illustrates an example environment 200 where trusted users and trusted services may access a secure execution environment operating within a computing resource service provider as described herein at least in connection with FIG. 1 and in accordance with at least one embodiment. As used herein with respect to trusted users and trusted services, the terms "trusted" may be understood to refer to a degree of isolation between users and the secure execution environment or between services and the secure execution environment. A trusted user or service may have access to functionality associated with a secure execution environment such as, for example, an authorization to send data to and/or to receive data from a secure execution environment, to instantiate applications within a secure execution environment and/or another secure execution environment. An untrusted user or service may not have such access to functionality associated with the secure execution environment and may be considered to be isolated from the secure execution environment. For example, a trusted user or service may receive and decrypt encrypted data from a secure execution environment via a mechanism such as an access key, certificate, or other access mechanism provided by the secure execution environment. An untrusted user or service may not be able to decrypt such encrypted data, thereby keeping such data isolated from the untrusted user or service. Applications running within a secure execution environment such as the secure execution environment applications 130 described herein at least in connection with FIG. 1 may be considered trusted applications while the provider services 114 and the host applications 132 (both as described herein at least in connection with FIG. 1) which may be isolated from the secure execution environment may be considered untrusted applications. Entities may also be considered untrusted or trusted with respect to one another. For example, a first secure execution environment that is not isolated from a second secure execution environment may be considered as trusted with respect to that second secure execution environment. Similarly, a first service which may be isolated from a second service may be considered as untrusted with respect to that second service. Other computer system entities may also be considered trusted or untrusted with respect to each other.

A trusted user 202 may access functionality associated with a secure execution environment 214 operating on a computer system 212. A user may be or may become a trusted user 202 by virtue of having possession of an access key associated with a secure execution environment as described herein. The access key may be provided to the trusted user 202 at the time that a secure execution environment is created, or as a result of having that key provided to the user or by another mechanism. The trusted user 202 may access functionality associated with a secure execution environment using a connection 206 using a computer system client device 204. The computer system 212 may be operating within a computing resource service provider 210. The computing resource service provider 210 may provide a distributed, virtualized and/or datacenter environment within which one or more applications, processes, services, virtual machines and/or other computer system entities may be executed. The trusted user 202 may be a person, or may be a process running on one or more remote computer systems, or may be another computer system entity, user, or process.

The command or commands to initiate the connection 206 to the computer system 212 may originate from an outside computer system, or may originate from an entity, user or process in a remote network location, or may originate from an entity, user or process within the computing resource service provider, or may originate from a user of the computer system client device 204, or may originate as a result of an automatic process or may originate as a result of a combination of these and/or other origin entities. In some embodiments, one or more commands may be used to first initiate a connection to the computing resource service provider. The command or commands to initiate the connection 206 to the computing resource service provider 210 may be sent to the computing resource service provider 210, without the intervention of the trusted user 202. The command or commands to initiate the connection 206 to the computer system 212 may originate from the same origin as the command or commands to connect to the computing resource service provider 210 or may originate from another computer system and/or server, or may originate from a different entity, user or process on the same or a different remote network location, or may originate from a different entity, user or process within the computing resource service provider, or may originate from a different user of a computer system client device 204, or may originate as a result of a combination of these and/or other same and/or different entities.

The trusted user 202 may request connection to the computing resource service provider 210 via a connection 206 and, in some embodiments, via a network 208 and/or via entities associated therewith, such as servers connected to the network, either directly or indirectly. The computer system client device 204 that may request access to the computer system 212 may include any device that is capable of connecting with a computer system via a network, including those discussed below. The network 208 may be a network or a combination of networks from network types discussed below.

The computing resource service provider 210 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other computer system services as may be running thereon. The computing resource service provider 210 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other device embodiments. In some embodiments, the host machines may be physical machines located within the computer system environment. In some embodiments, the host machines may be guest virtual machines operating on physical machines located within the computer system environment.

A secure execution environment 214 may be operating within the computer system 212. The secure execution environment 214 may contain and/or otherwise administer access to one or more secure execution environments and may also contain and/or otherwise administer secured services 216 operating within the secure execution environment 214. As described herein, the secure execution environment 214 may be configured to provide access to the secure execution environment functionality by trusted users and/or services so that, for example, those trusted users and/or services may access and use the functionality associated with the secure execution environment 214. A user, client, service, process, application, module, or other entity with access to a service and/or access to the resources served by that service may use that secure execution environment functionality to further secure data and/or applications associated with that service. Trusted users and/or services may use the secure execution environment functionality to create secure execution environments, populate secure execution environments with data and/or applications, obtain keys for decrypting results from secure execution environments, measure secure execution environments, start applications within secure execution environments, retrieve data from secure execution environments and other such secure execution environment functionality. The trusted user 202 may connect to the secure execution environment 214 via the connection 206 or via an additional connection such as a dedicated connection established to connect to the secure execution environment 214. The additional connection may share one or more characteristics in common with the connection 206 as described herein.

One or more trusted provider services 234 operating within the computing resource service provider environment may access functionality associated with the secure execution environment 214 using one or more connections 236. Trusted provider services may be operating on computer systems within the computing resource service provider 210 environment. A provider service may become one of the trusted provider services 234 by virtue of having possession of an access key associated with a secure execution environment 214 as described herein. Access keys may be provided to the trusted provider services 234 at the time that a secure execution environment is created, or as a result of having that key provided to the provider service or by another mechanism. For example, a provider service configured to provide database services may be configured to receive and store encrypted data from a secure execution environment 214. Such a database service may become a trusted provider service and may be provided with the access key so that the database service can receive encrypted data from the secure execution environment.

In some embodiments, an untrusted user 218 may connect to the computer system 212 and/or to another service operating within the computing resource service provider 210 using a connection 222 and may connect to the computer system 212 and/or to another resource within the computing resource service provider 210 using a computer system client device 220. The untrusted user 218 may be a person, or may be a process running on one or more remote computer systems, or may be another computer system entity, user, or process. A user may be an untrusted user 218 by virtue of not having possession of an access key associated with a secure execution environment 214. The command or commands to initiate the connection 222 to the computer system 212 and/or to another resource within the computing resource service provider 210 may originate from an outside computer system and/or server, or may originate from an entity, user or process in a remote network location, or may originate from an entity, user or process within the computing resource service provider 210, or may originate from a user of the computer system client device 220, or may originate as a result of an automatic process or may originate as a result of a combination of these and/or other origin entities.

The command or commands to initiate the connection 222 to the computer system 212 and/or to another resource within the computing resource service provider 210 may be sent to the computer system 212, without the intervention of the untrusted user 218. The command or commands to initiate the connection 222 to the computer system 212 may originate from the same origin as the command or commands to connect to the computing resource service provider 210 or may originate from another computer system and/or server, or may originate from a different entity, user or process on the same or a different remote network location, or may originate from a different entity, user or process within the computing resource service provider, or may originate from a different user of a computer system client device 220, or may originate as a result of a combination of these and/or other same and/or different entities.

The untrusted user 218 may connect to resources within the computing resource service provider 210 via a network 238 and/or via entities associated therewith, such as servers connected to the network, either directly or indirectly. The computer system client device 220 that may request access to the computer system 212 may include any device that is capable of connecting with a computer system via a network, including at least servers, laptops, mobile devices such as smartphones or tablets, other smart devices such as smart watches, smart televisions, set-top boxes, video game consoles and other network-enabled smart devices, distributed computer systems and components thereof, abstracted components such as guest computer systems or virtual machines and/or other types of computing devices and/or components. As with the network 208 described herein, the network 238 may include a variety of network types. In some embodiments, the network 208 may be the same as the network 238.

An untrusted user 218 may attempt to access functionality associated with the secure execution environment 214 using a connection 222 using the network 238 and may also attempt to access the secured services 216 operating within the secure execution environment 214. As indicated in the example illustrated in FIG. 2, the attempt by the untrusted user 218 to connect to the secure execution environment 214 may fail. In some embodiments, the attempt by the untrusted user 218 to connect to the secure execution environment 214 may fail at connection initiation, or may fail during key verification, or may fail when a secure execution environment command is attempted or may fail at another time. In some embodiments, an untrusted user 218 may have permission to perform a subset of activities or commands in connection with the secure execution environment 214 in accordance with one or more system policies. In some embodiments, an untrusted user 218 may be restricted from all access to the secure execution environment 214 and may also be restricted from all access to the secured services 216 operating within the secure execution environment 214.

Computer system services 226 may attempt to access functionality associated with the secure execution environment 214 via connection 228 and/or may attempt to access secured services 216 operating therein. Computer system services 226 are other services (e.g., applications) running within the computer system 212. In some embodiments, one or more of the computer system services 226 may be trusted as a result of having possession of an access key associated with a secure execution environment 214 as described herein. Such trusted computer system services may have access to the secure execution environment 214 and/or to secured services 216 operating within the secure execution environment 214.

In some embodiments, one or more of the computer system services 226 may be untrusted as a result of not having possession of an access key associated with a secure execution environment 214 as described herein. In such embodiments, the connection 228 to the secure execution environment 214 and/or the connection to the secured services 216 within the secure execution environment 214 may not be allowed. Such untrusted computer system services may not have access to functionality associated with the secure execution environment 214 and/or to secured services 216 operating within the secure execution environment 214, or may have partial access to functionality associated with the secure execution environment 214, or may have partial access to secured services 216 operating within the secure execution environment 214 or may have a combination of these and/or other access levels. For example, one or more computer system services 226 may have permission to query the secure execution environment 214 and/or may have permission to request trusted status from the secure execution environment 214, but may not be granted any other permissions associated with the secure execution environment 214. In some embodiments, one or more of the computer system services may be trusted computer system services 242 and may be configured to have access to the secure execution environment 214 via connection 240 and/or to secured services 216 operating within the secure execution environment 214.

One or more untrusted provider services 230 operating within the computing resource service provider environment may attempt to access functionality associated with the secure execution environment 214 using one or more connections 232. As with trusted provider services 234, untrusted provider services 230 may be operating on computer systems within the computing resource service provider 210 environment. A provider service may be untrusted as a result of not having possession of an access key associated with a secure execution environment 214 as described herein. As indicated in the example illustrated in FIG. 2, the attempt by one of the untrusted provider services 234 to connect to the secure execution environment 214 may fail, for example, at connection initiation, at key verification, when a secure execution environment command is attempted or at another time. As with an untrusted user 218, untrusted provider services 230 may have permission to perform a subset of activities or commands in connection with the secure execution environment 214 in accordance with one or more system policies. In some embodiments, untrusted provider services 230 may be restricted from all access functionality associated with the secure execution environment 214 and may also be restricted from all access to the secured services 216 operating within the secure execution environment 214.

In some embodiments, the computer system services 226 and/or the untrusted provider services 230 may have access to the trusted provider services 234 as provided by the computing resource service provider 210. The trusted provider services 234 may be configured to provide access functionality associated with the secure execution environment 214 and/or secured services 216 operating within the secure execution environment 214 to other clients using a service such as a policy service described herein at least in connection with FIG. 1. As described herein, the policy service may be configured to grant access rights, revoke access rights, access key services, provide key services to users and/or services or to provide other functionality to users and entities such as the trusted user 202 or the trusted provider services 234 as well as to the untrusted user 218, the computer system services 226, the untrusted provider services 230 or other users and/or services associated with the computing resource service provider.

Figure 3:
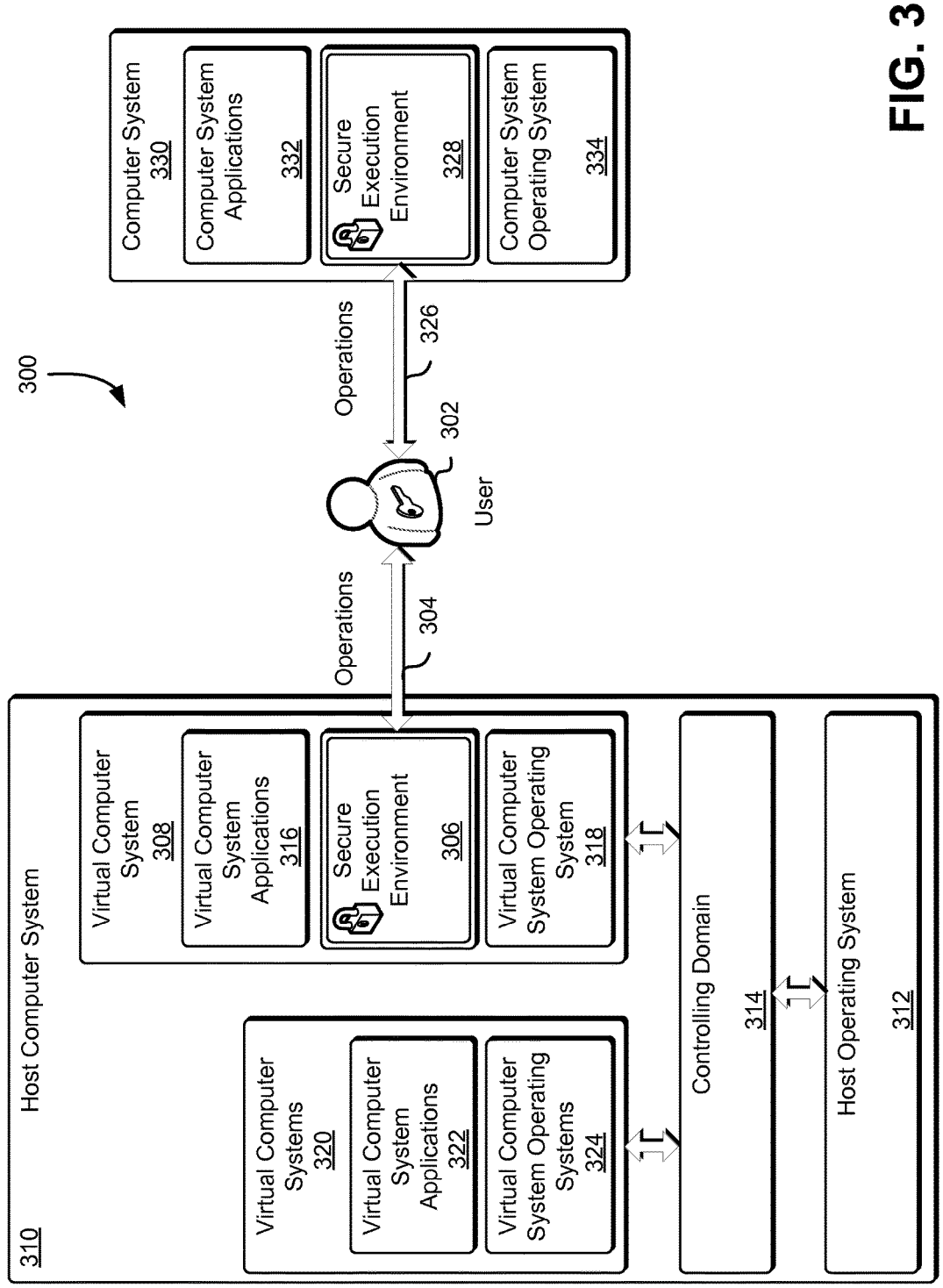
FIG. 3 illustrates an example environment where secure execution environment operations may be performed on secure execution environments in accordance with at least one embodiment.

FIG. 3 illustrates an example environment 300 where a user may perform one or more secure execution environment operations on secure execution environments as described herein at least in connection with FIG. 2 and in accordance with at least one embodiment. A user 302 may execute one or more operations 304 associated with a secure execution environment 306 on a virtual computer system 308. The virtual computer system 308 may be one of one or more virtual computer systems operating on a host computer system 310. The host computer system 310 may be operating within a computing resource service provider environment such as the computing resource service provider 210 as described herein at least in connection with FIG. 2 and in accordance with at least one embodiment. The secure execution environment 306 may include applications (and data associated with such applications) including applications, processes, modules, services (such as, for example, the secured services 216 described herein at least in connection with FIG. 2 and in accordance with at least one embodiment) and/or other computer system entities.

The user 302 may also execute one or more operations 326 associated with a secure execution environment 328 on a computer system 330. The computer system 330 may be one of one or more computer systems operating within a computing resource service provider environment such as the computing resource service provider 210 as described herein at least in connection with FIG. 2 and in accordance with at least one embodiment. The secure execution environment 328 may include applications (and data associated with such applications) including applications, processes, modules, services (such as, for example, the secured services 216 described herein at least in connection with FIG. 2 and in accordance with at least one embodiment) and/or other computer system entities. The operations 304 and the 326 may include one or more secure execution environment operations for administering secure execution environments and/or the applications and/or data contained therein. Secure execution environment operations may include creating secure execution environments, destroying secure execution environments, measuring secure execution environments, populating secure execution environments, growing secure execution environments, starting secure execution environments, stopping secure execution environments, describing secure execution environments, updating secure execution environments, generating keys for secure execution environments, sending data to secure execution environments, receiving data from secure execution environments, starting applications within secure execution environments, stopping applications within secure execution environments and/or other secure execution environment operations.

For example, a user may execute a secure execution environment operation to create a secure execution environment such as the secure execution environment 306 within the virtual computer system 308 on the host computer system 310. The operations to create (or build) a secure execution environment may include operations to allocate a secure execution environment location, operations to load values into the secure execution environment, operations to measure those stored values. Further operations may include operations to remove the secure execution environment when it is finished, enter, resume and exit the secure execution environment, perform memory paging, debug the secure execution environment and generate secure execution environment keys. For example, a user may use a secure execution environment by first issuing API calls to create a secure execution environment. Then the user may then add memory pages to the secure execution environment which may contain data and/or executable code. The user may next measure the secure execution environment and, if the measurement indicates that the secure execution environment is valid, the user may finalize initiation of the secure execution environment. During the lifecycle of the secure execution environment, the user may start and stop the applications in the secure execution environment and perform other operations such as those described herein. When the secure execution environment is no longer needed, the user may finally cause it to be removed from the system.

The user, which may now be a trusted user as a result of acquiring an access key as a result of creating the secure execution environment as described herein, may then install and start an application such as a bootloader on the secure execution environment which may, in turn, upload data and/or other applications within the secure execution environment. The bootloader may be configured to decrypt uploaded data and/or applications and may also be configured to validate such uploaded data and/or applications. As resource needs for the secure execution environment increase or decrease, the size of the secure execution environment and/or the resources associated with the secure execution environment may be increased or decreased as required, using one or more other secure execution environment operations. When the secure execution environment is no longer needed, it may be depopulated and/or destroyed as needed, using one or more other secure execution environment operations. As may be contemplated, the secure execution environment operations described herein are illustrative examples and other secure execution environment operations may be considered as within the scope of the present disclosure.

As described herein, a secure execution environment such as secure execution environment 306 or secure execution environment 328 may not allow access to functionality associated with the secure execution environments by any entity except trusted entities as described herein at least in connection with FIG. 2 and in accordance with at least one embodiment. For example, entities on the virtual computer system 308 such as virtual computer system applications 316, virtual computer system operating system 318 or other entities may not access applications or data stored within secure execution environment 306 unless they are trusted by the secure execution environment 306. Similarly, other entities on the host computer system 310 including, but not limited to, other virtual computer systems 320, other virtual computer system applications 322 and/or other virtual computer system operating systems 324 also may not access applications or data stored within secure execution environment 306 unless they are trusted by the secure execution environment 306. Additionally, entities that have privileged access to the host computer system 310 such as controlling domain 314 or host operating system 312 also may not access applications or data stored within secure execution environment 306 unless they are trusted by the secure execution environment 306. Similarly, entities operating on computer system 330 such as computer system applications 332 and entities that have privileged access to the computer system 330 such as computer system operating system 334 also may not access applications or data stored within secure execution environment 328 unless they are trusted by the secure execution environment 328. In the example environment illustrated in FIG. 3, a connection for operations 304 is illustrated between a user 302 and a secure execution environment 306, and another connection for operations 326 is illustrated between the user 302 and a secure execution environment 328. In some embodiments a secure execution environment such as the secure execution environment 306 may be directly connected to a secure execution environment such as the secure execution environment 328 without an intervening user, service, process, application, and/or other entity. In such embodiments, the secure execution environment 306 may be trusted by (or not isolated from) the secure execution environment 328 and in such embodiments, the secure execution environment 328 may be trusted by (or not isolated from) the secure execution environment 306.

Figure 4:
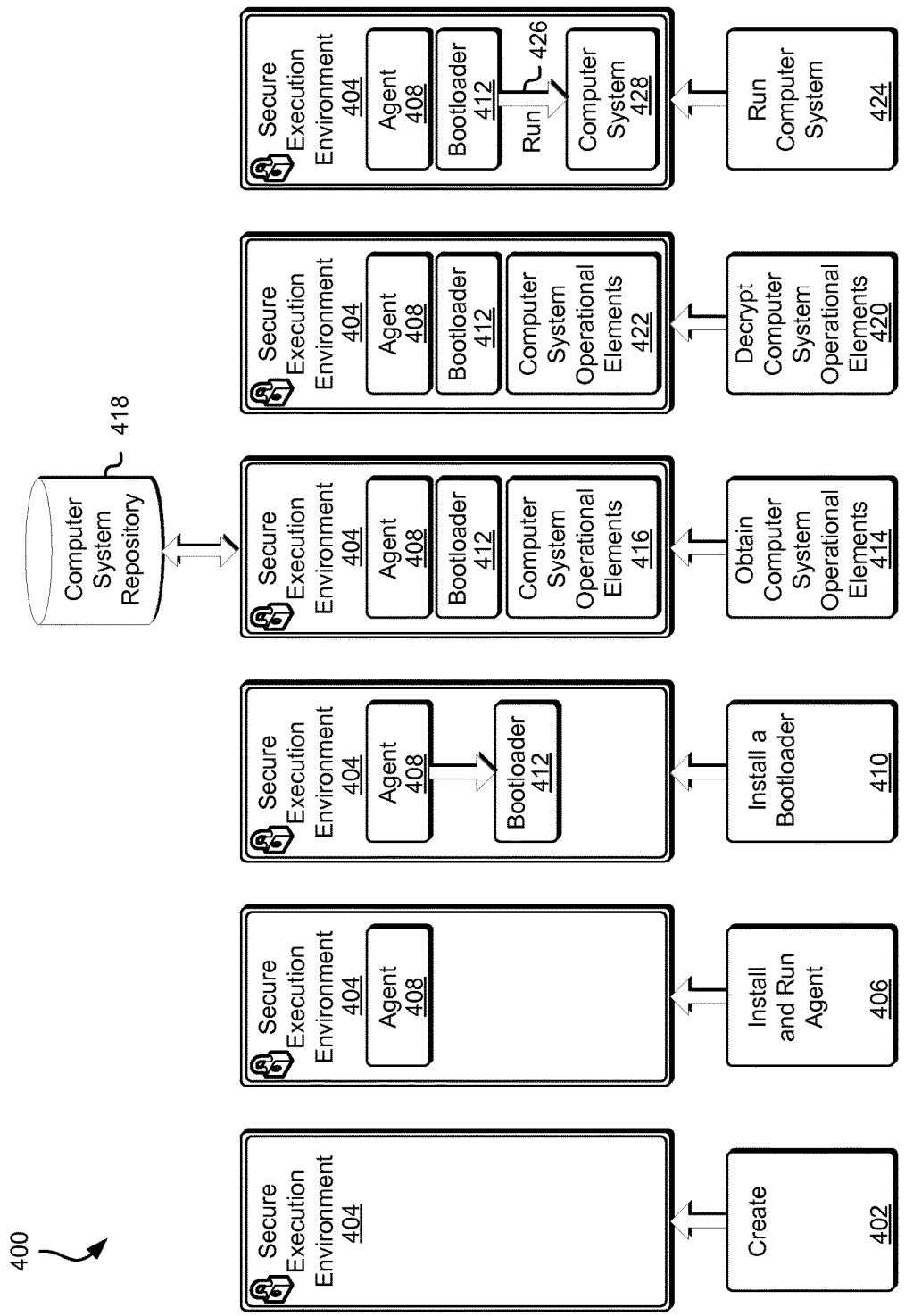
FIG. 4 illustrates an example environment where operations to create and populate a secure execution environment may be performed in accordance with at least one embodiment.

FIG. 4 illustrates an example environment 400 where secure execution environment operations may be executed on a secure execution environment operating as a service as described herein at least in connection with FIG. 2 and in accordance with at least one embodiment. A secure execution environment operation to create a secure execution environment 402 may be sent to one or more applications, processes, modules and/or other entities configured to perform secure execution environment operations as described herein at least in connection with FIG. 2 and in accordance with at least one embodiment. As a result of the secure execution environment operation to create a secure execution environment 402, a secure execution environment 404 may be created and made available to users and/or services within a computing resource service provider environment. A secure execution environment operation to install and run an agent 406 may then be executed on the secure execution environment 404 and as a result of that operation, an agent 408 may then be instantiated within the secure execution environment 404.

An agent 408 may be instantiated on a computer system (e.g., within a secure execution environment 404 on the computer system) to provide secure execution environment functionality. The agent 408 may be instantiated on the computer system by a second computer system which may be configured to instantiate an agent on the computer system. The agent 408 may be instantiated on the second computer system in response to a request by the first computer system. The agent 408 may be code that may be verified by a computing resource service provider, or may be verified by the customer, or may be verified by a third-party or may be verified by another entity. The agent 408 may also be configured to provide one or more other measurements of the contents of the secure execution environment to the customer that created the secure execution environment so that, for example, secondary verifications of the integrity of the secure execution environment may performed by the customer, the computing resource service provider, a third party or another entity.

In some embodiments, the agent 408 may be configured to perform one or more secure execution environment operations on the secure execution environment 404 so that the secure execution environment 404 may be further configured to provide desired functionality. The agent 408 may be configured to perform the one or more operations as a result of receiving one or more external commands, or may be configured to perform the one or more operations as a result of one or more commands specified by the agent or may be configured to perform the one or more operations as a result of a combination of external commands and commands specified by the agent. For example, the agent 408 may execute a secure execution environment operation to install a bootloader 410 which may, in turn, be configured to locate and/or instantiate the applications and/or data to be installed within the secure execution environment by the bootloader. As described herein, a bootloader is an application, process, module or other entity configured to locate and instantiate executable code and/or data within a computer system. The agent may first receive the bootloader, may then decrypt the bootloader if it had been previously encrypted and may finally verify the bootloader using one or more measurements of the bootloader. In some embodiments, the agent may be configured to provide measurements of the bootloader once it has been instantiated within the secure execution environment by pausing and/or otherwise freezing the secure execution environment and obtaining one or more measurements from specialized instructions running on the host CPU, which may in turn be verified within the secure execution environment or may be sent outside the secure execution environment in encrypted form, to be stored and/or validated. In some embodiments, the agent may implement the bootloader functionality itself. In some embodiments, the bootloader functionality may be placed within the secure execution environment upon instantiation.

The applications and/or data to be installed within the secure execution environment by the bootloader may include any applications and/or data as may be required by the customer. In the example illustrated in FIG. 4, the applications and data may include elements such as computer system operational elements to instantiate computer system service functionality within the secure execution environment. For example, a customer may require functionality to store a collection of cryptographic keys within the secure execution environment relating to access to certain encrypted data stored within the computer system. The bootloader may instantiate an application to receive requests for new keys, store keys within a file, remove keys from the file and to provide encrypted copies of those cryptographic keys to authorized users. The bootloader may also instantiate a file of preloaded keys that may be stored within the secure execution environment and may only be sent outside the secure execution environment using an encryption schema that may only be decrypted by a user with proper credentials as associated with the secure execution environment. The cryptographic keys may remain safe from being intercepted by any other entity within the computer system, thus ensuring the security of the certain encrypted data. The cryptographic keys may be used to secure memory writes to memory within the secure execution environment so that the memory is not readable by any entity outside of the secure execution environment. Private cryptographic keys may be protected by (i.e., stored within) the secure execution environment and may have corresponding public cryptographic keys that may be made available outside of the secure execution environment. Data may then be encrypted outside of the secure execution environment using the public cryptographic key and decrypted within the secure execution environment using the private cryptographic key. A bootloader may also install more complicated applications and data within the secure execution environment including entire virtual computer system instances. In some embodiments, a secure execution environment may be created with a virtual computer system instance preloaded and configured to run.

Applications and/or data installed in a secure execution environment may also include applications to provide access to and/or to process other types of sensitive data. For example, applications may be installed to emulate hardware, provide network connections, provide access to restricted data types, provide other encryption methodologies and/or other application types. Such applications may be instantiated in secure execution environments using typical installation methods as described herein, or as instantiated as device drivers, or as kernel modules, or as virtual hardware and/or other instantiation methods. Applications may be migrated from controlling domains or from a host operating system, or from secured computer system domains or from combinations of these and/or other locations. Applications may also be converted to secure execution environment versions by altering one or more aspects of the application. For example, an payment processing application running as a web service on a computer system such as a computer system provided by a computing resource service provider may be converted to run as a secured service within a secure execution environment by first suspending the application, then measuring the application, then converting the application to enable access to secure execution environment functionality, then encrypting the application, then migrating the application to the secure execution environment and finally by decrypting and restoring the application to run within the secure execution environment. A web service application may be an application that is configured to run within a computing resource service provider environment and that is configured to provide services to one or more client applications using an interface such as a web interface of a network such as the Internet.

In some embodiments, the bootloader 412 installed by the secure execution environment operation to install a bootloader 410 may be configured to locate and install one or more computer system operational elements. As used herein, the term "computer system operational elements" may refer to computer system applications, computer system data, computer system data associated with computer system applications, programs, modules, sets of executable instructions or combinations of these and/or other elements. In some embodiments, the bootloader 412 may be a separate application from the agent 408. In some embodiments, the bootloader 412 may be the same application as the agent 408.

The agent 408 and/or the bootloader 412 may be further configured to perform one or more secure execution environment operations to locate and obtain computer system operational elements 414. The computer system operational elements 416 may be obtained from a computer system repository 418 which may contain a plurality of such computer system operational elements. In some embodiments, the computer system operational elements 416 may be obtained as a single block of data which may specify the computer system. In some embodiments, the computer system operational elements 416 may be obtained as a plurality of blocks of data, each block of data specifying one or more parts of the computer system such as data, applications, drivers, network connections, resource requirements, policies, and/or other computer system operational elements. In some embodiments, the computer system operational elements 416 may be retrieved from the computer system repository 418 in response to receiving one or more commands. The one or more commands may be issued by the agent 408, the bootloader 412, or another entity. The one or more commands may be issued as webservice commands, API calls, library calls, or another command methodology.

Retrieving the computer system operational elements from the computer system repository 418 may include retrieving computer system images (e.g., kernel images) directly or using a bootloader as described herein. The computer system operational elements may include computer system images which may include a secure execution environment or may include computer system images which may be configured to create a secure execution environment. The computer system operational elements may include specifications for processes configured to create a secure execution environment using, for example, a device driver and/or a kernel module. As may be contemplated, the types of computer system operational elements as described herein, the methods for retrieving those computer system operational elements as described herein and the locations that those computer system operational elements are retrieved from as described herein are illustrative examples and other types of computer system operational elements, methods for retrieving those computer system operational elements and the locations that those computer system operational elements are retrieved from may be considered as within the scope of the present disclosure.

In some embodiments, the computer system operational elements 416 may be encrypted. In such embodiments, the agent 408 and/or the bootloader 412 may be configured to perform one or more operations to decrypt the computer system operational elements 420 to produce the decrypted computer system operational elements 422. Finally, the agent 408 and/or the bootloader 412 may be configured to perform one or more operations to run one or more applications associated with the computer system 424. In some embodiments, the bootloader 412 may execute a command instructing the computer system 428 to run 426, thereby starting the one or more applications associated with the computer system 428.

Figure 5:
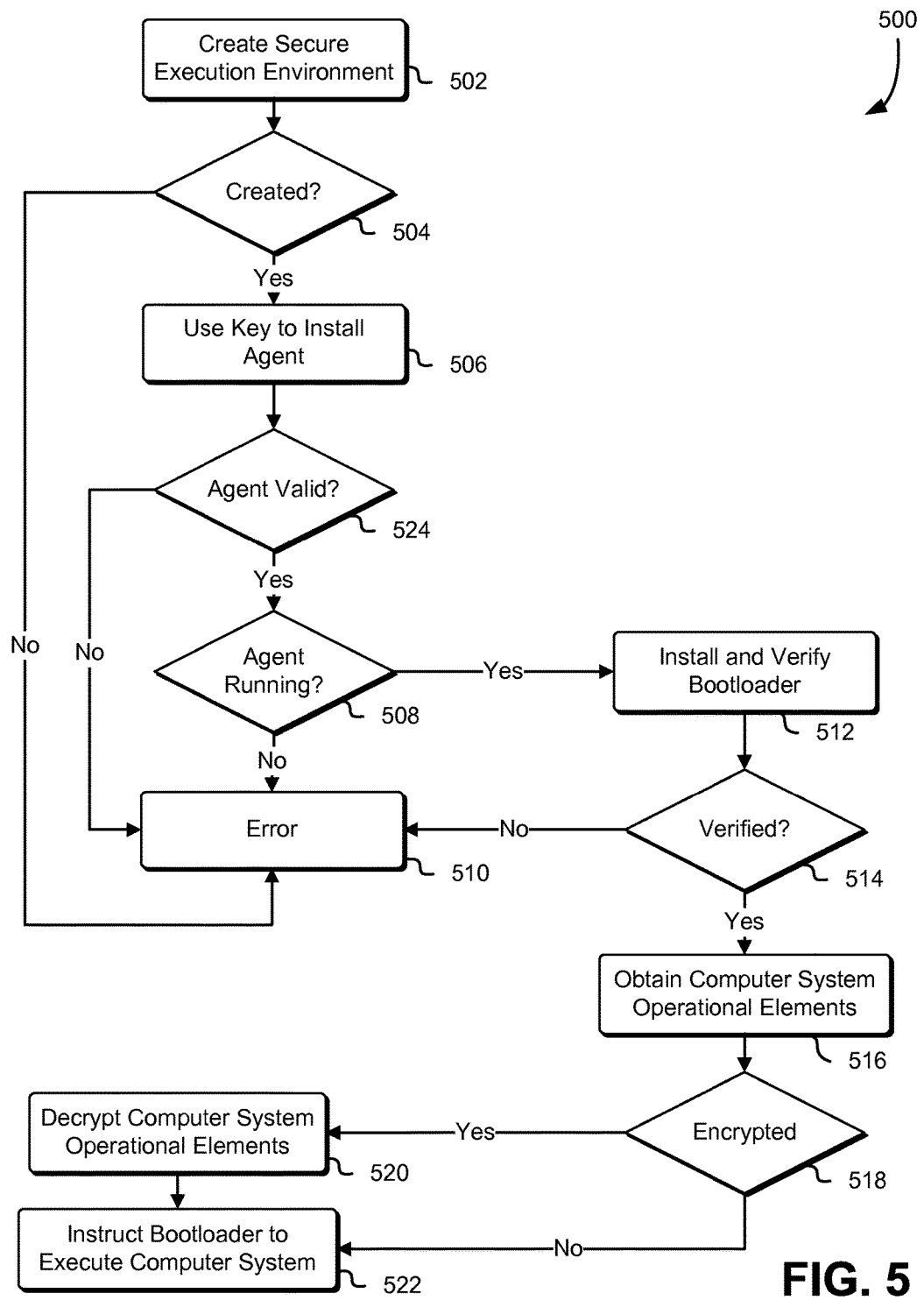
FIG. 5 illustrates an example process for instantiating and populating a secure execution environment in accordance with at least one embodiment.

FIG. 5 illustrates an example process 500 for instantiating and populating a secure execution environment as described herein at least in connection with FIG. 2 and in accordance with at least one embodiment. An agent such as the agent 408 described herein at least in connection with FIG. 4 may perform at least a portion of the process illustrated in FIG. 5. A bootloader such as the bootloader 412 described herein at least in connection with FIG. 4 may perform at least a portion of the process illustrated in FIG. 5. Other entities operating with a computer system environment may also perform at least a portion of the process illustrated in FIG. 5.

An application or other entity configured to provide secure execution environment functionality may receive a command to create a secure execution environment 502. The secure execution environment may be created as described herein and, if successfully created 504, the secure execution environment key may be used to install an agent 506 such as the agent 408 described herein at least in connection with FIG. 4 and in accordance with at least one embodiment. After the agent is installed, the secure execution environment may attempt to determine whether the agent is valid 524 by providing one or more measurements of the contents of the secure execution environment. If the secure execution environment is not successfully created, installed, executed, and validated, the application, process, module, and/or other entity configured to provide secure execution environment functionality may, in some embodiments, enter an error state 510 which may be reported to one or more users, services, processes and/or other computer system entities. In some embodiments, the validity of the secure execution environment may be measured at one or more points during the secure execution environment instantiation process illustrated in FIG. 5. For example, the secure execution environment validity may be measured after instantiation, installation of the agent, installation of other applications and/or at other times during instantiation.

If the agent is successfully created, validated and is running 508 bootloader may then be installed and verified 512. Computer system operational elements 516 may then be obtained to instantiate applications and/or data within the secure execution environment. If the bootloader is not successfully verified 514, the process may enter an error state 510 which may be reported to one or more users, services, processes and/or other computer system entities. It may then be determined whether the computer system operational elements are encrypted 518 and if so, the computer system operational elements may be decrypted 520. Finally, the bootloader may execute the computer system 522 by, for example, starting one or more applications within the secure execution environment. In some embodiments, the agent and/or the bootloader may continue to obtain computer system operational elements 516 and, if encrypted 518, the computer system operational elements may be decrypted 520 before they are executed. This process may continue until the computer system operational elements are completely instantiated.

Measurements may be evaluated within the secure execution environment or may be sent outside of the secure execution environment. A secure execution environment may be configured such that measurements are performed entirely within a secure portion of the CPU and may also be configured so that the measurements are signed by secret material provided by the CPU such as, for example, by microcode running on the CPU. In this way, measurements may be verified as correct by users using functionality provided in association with the secure execution environment. Measurements may be verified by, for example, an API which may provide information usable to determine the state of a processor wherein such information may be cryptographically verified as having been validated by a trusted entity such as the processor, a trusted platform module or another trusted entity. In some embodiments, a measurement may be unique to the version of the microcode.

In some embodiments, a measurement may be based at least in part on a per-processor key which may specify a certificate. In some embodiments, the certificate may be based at least in part on a common parent such as, for example, a certificate from a computer system, a computer system environment, a computer system provider and/or another common parent. The results may be sent outside the secure execution environment by first encrypting the results using an encryption key generated within the secure execution environment and then by sending the one or more encrypted results to the customer, or to a data store, or to a database, or to a service such as a webservice or to another storage location.

An agent may provide one or more measurements to validate the secure execution environment and the contents of the secure execution environment. These measurements may be based at least in part on measurements obtained from the host computer system hardware such as, for example, measurements obtained from the SGX instructions running on the CPU, or instructions obtained from a TPM. The secure execution environment may be more accurately measured if the secure execution environment has been paused or frozen. A secure execution environment may be paused or frozen by halting the execution of applications running within the secure execution environment and/or by placing those applications in a certain determined state. Pausing and/or freezing applications and/or placing them in a certain determined state may allow external verification that a secure execution environment has not been tampered with by, for example, comparing the measurements to some known values. Measurements may, in some embodiments, include verification and/or validation that the measurement functionality was performed by a trusted, verified, and/or validated source. For example, measurements performed by Intel® SGX instructions running on an Intel® CPU may be verified as coming from a genuine Intel® processor and may be signed by that processor as genuine, with the signature being verifiable as such. Measurements coming from a TPM may include a similar verifiable signature of the measurements, with an assurance that the measurements were performed by the TPM and/or a process running thereon.

Figure 6:
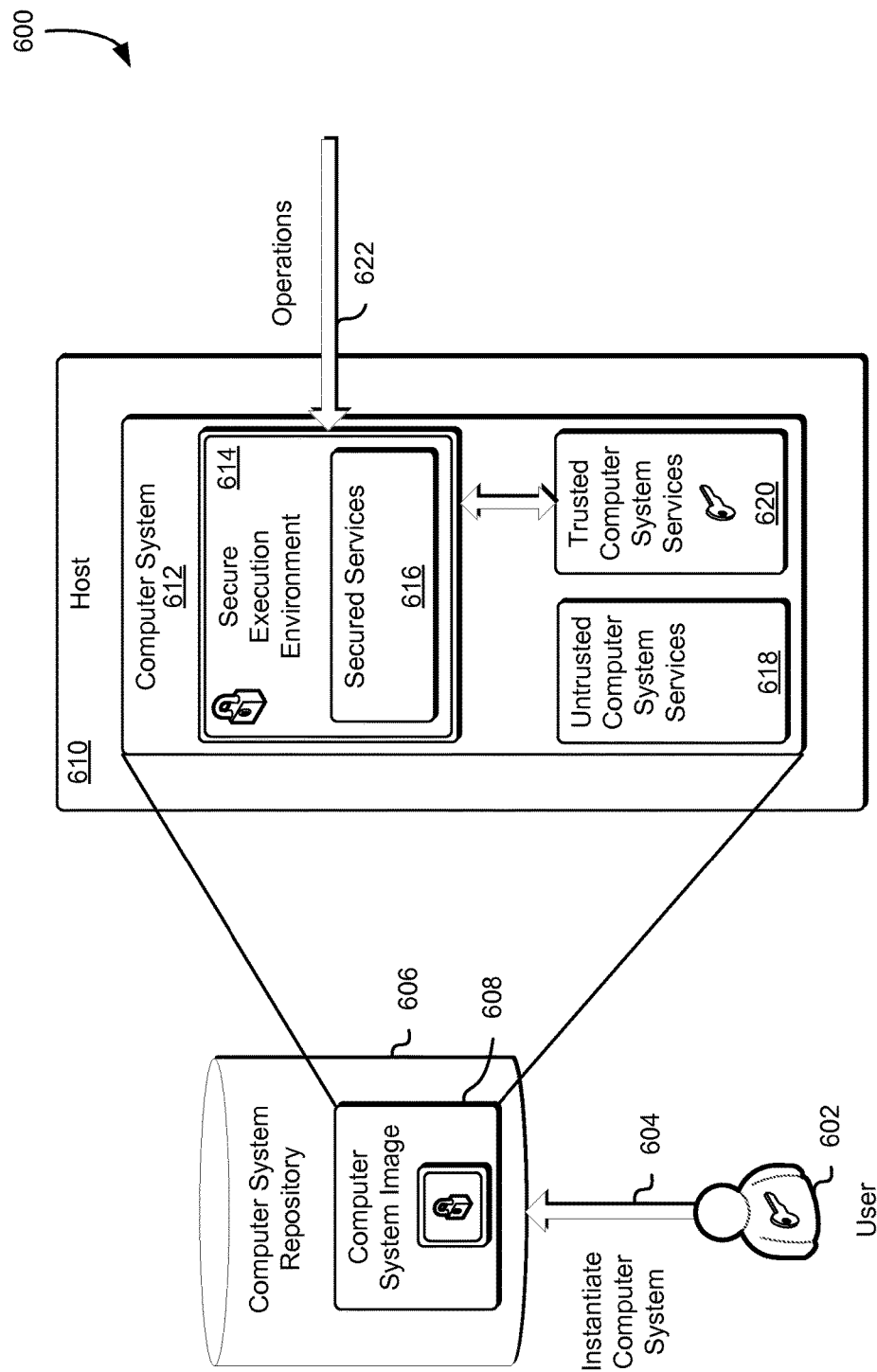
FIG. 6 illustrates an example environment where computer system image with a secure execution environment may be instantiated on a host computer system in accordance with at least one embodiment.

FIG. 6 illustrates an example environment 600 where a computer system image with a secure execution environment may be instantiated on a host computer system as described herein at least in connection with FIG. 2 and in accordance with at least one embodiment. A user 602 such as the user 302 described herein at least in connection with FIG. 3 may issue a command 604 to instantiate a computer system. In some embodiments, the command may be sent to a process, program, service, application and/or other computer system entity configured to locate an appropriate location to instantiate the computer system. The command 604 to instantiate a computer system may locate and/or construct a computer system image 608 from resources contained in a computer system repository 606. The computer system image 608 may contain a specification to instantiate a secure execution environment within the computer system such as the secure execution environments described herein. The specification to instantiate the secure execution environment may include one or more operations to instantiate the secure execution environment only if there is available hardware to support the secure execution environment. The specification to instantiate the secure execution environment may include one or more operations to instantiate the secure execution environment using virtual hardware such as, for example, a virtual TPM or a virtual CPU with support for SGX instructions. In some embodiments, the specification to instantiate the secure execution environment may include one or more operations to instantiate the secure execution environment in a nascent, paused, halted, suspended and/or otherwise incomplete state such that the secure execution environment may not be completely functional and may, for example, not consume computer system resources. In such embodiments, the secure execution environment may be later completed, resumed, restored, and/or otherwise by placed in a complete and functional state in response to one or more secure execution environment operations such as the secure execution environment operations described herein at least in connection with FIG. 3 and in accordance with at least one embodiment.

The computer system 612 may be instantiated on a host 610 with resources available for the computer system. The computer system 612 may be instantiated with a secure execution environment 614 which may include one or more secured services 616 within the secure execution environment. The computer system 612 may include one or more untrusted computer services 618 which may not be configured with trusted access to the secure execution environment 614 and/or to the secured services 616. The computer system 612 may also include one or more trusted computer system services 620 which may be configured with trusted access to the secure execution environment 614 and/or to the secured services 616. As mentioned previously herein, the computer system may be configured to receive one or more operations 622 such as secure execution environment operations to start a secure execution environment, stop a secure execution environment, pause a secure execution environment, update a secure execution environment, remove a secure execution environment and/or other secure execution environment operations. For example, the operations 622 may include operations to install secured services 616 within the secure execution environment 614 or may include operations to remove secured services 616 from the secure execution environment 614. The operations 622 may also include operations to promote computer system services to trusted computer system services by granting them access to cryptographic keys associated with the secure execution environment 614. The operations 622 may also revoke such access. As may be contemplated, the secure execution environment operations described herein are illustrative examples and other secure execution environment operations may be considered as within the scope of the present disclosure.

Figure 7:
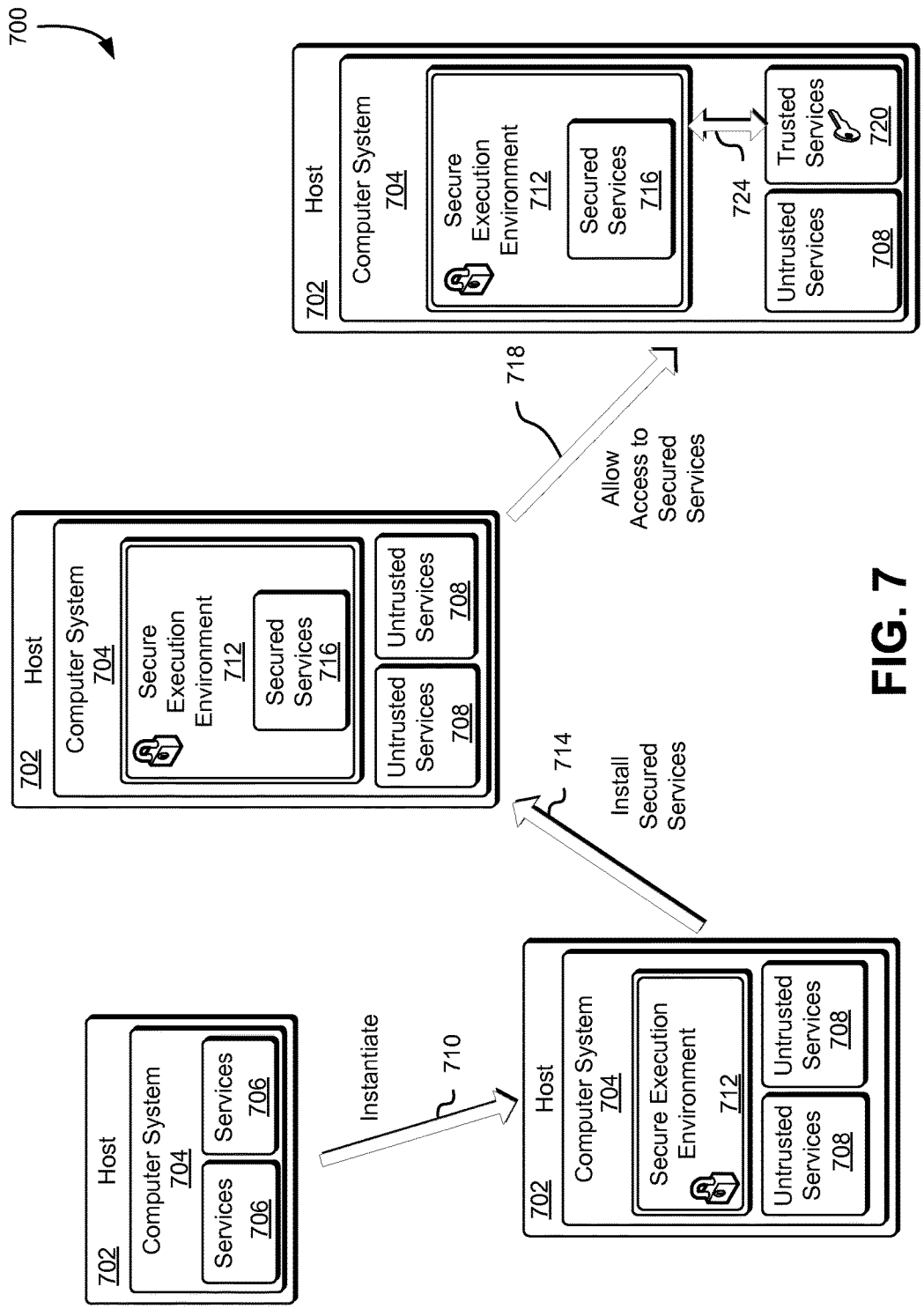
FIG. 7 illustrates an example environment where a secure execution environment that may include one or more secured services may be instantiated in accordance with at least one embodiment.

FIG. 7 illustrates an example environment 700 where a secure execution environment that may include one or more secured services may be instantiated within a computer system as described herein at least in connection with FIG. 2 and in accordance with at least one embodiment. A computer system 704 may be running on a host 702 with one or more services 706. A command 710 to instantiate a secure execution environment within the computer system may be received. In response to that command 710, one or more operations may be performed to instantiate the secure execution environment 712 within the computer system 704. The one or more operations that may be performed to instantiate the secure execution environment 712 within the computer system 704 may include one or more operations such as secure execution environment operations, operating system operations, and/or controlling domain operations (as may be performed by a controlling domain such as a hypervisor). For example, the secure execution environment 712 may be instantiated within the computer system as a device driver, or as a kernel module, or as a kernel application or in another manner. Once a secure execution environment 712 has been instantiated, the one or more services 706 may become one or more untrusted services 708 if they do not have trusted access to the secure execution environment 712. As may be contemplated, the methods to instantiate the secure execution environment within the computer system described herein are illustrative examples and other methods to instantiate a secure execution environment within a computer system may be considered as within the scope of the present disclosure.

After the secure execution environment 712 is instantiated within the computer system 704, a command to install secured services 714 within the secure execution environment may be received. In response to the command to install secured services 714 within the secure execution environment, one or more operations may be performed to install the secured services 716 within the secure execution environment 712. As was mentioned previously herein, the one or more operations that may be performed to install the secured services 716 within the secure execution environment 712 may include one or more operations such as secure execution environment operations, operating system operations, and/or controlling domain operations (as may be performed by a controlling domain such as a hypervisor). For example, the one or more secured services 716 may be instantiated using a call to the controlling domain or to the host computer and the one or more secured services may be installed from a computer system repository such as the computer system repository 418 described herein at least in connection with FIG. 4. As may be contemplated, the methods to install the secured services within the secure execution environment described herein are illustrative examples and other methods to instantiate secured services within a secure execution environment may be considered as within the scope of the present disclosure.

After the secured services 716 are installed within the secure execution environment 712, a command to allow access to the secured services 718 may be received. In response to the command to allow access to secured services 718, one or more operations may be performed to allow access to the secured services 718. The one or more operations that may be performed to allow access to secured services 718 may include one or more operations such as secure execution environment operations, operating system operations, and/or controlling domain operations (as may be performed by a controlling domain such as a hypervisor). For example, API calls to the secure execution environment may be issued to generate cryptographic keys to provide access 724 to one or more services, thereby making them trusted services 720. As may be contemplated, the methods to provide access to secured services described herein are illustrative examples and other methods to provide access to secured services may be considered as within the scope of the present disclosure.

Figure 8:
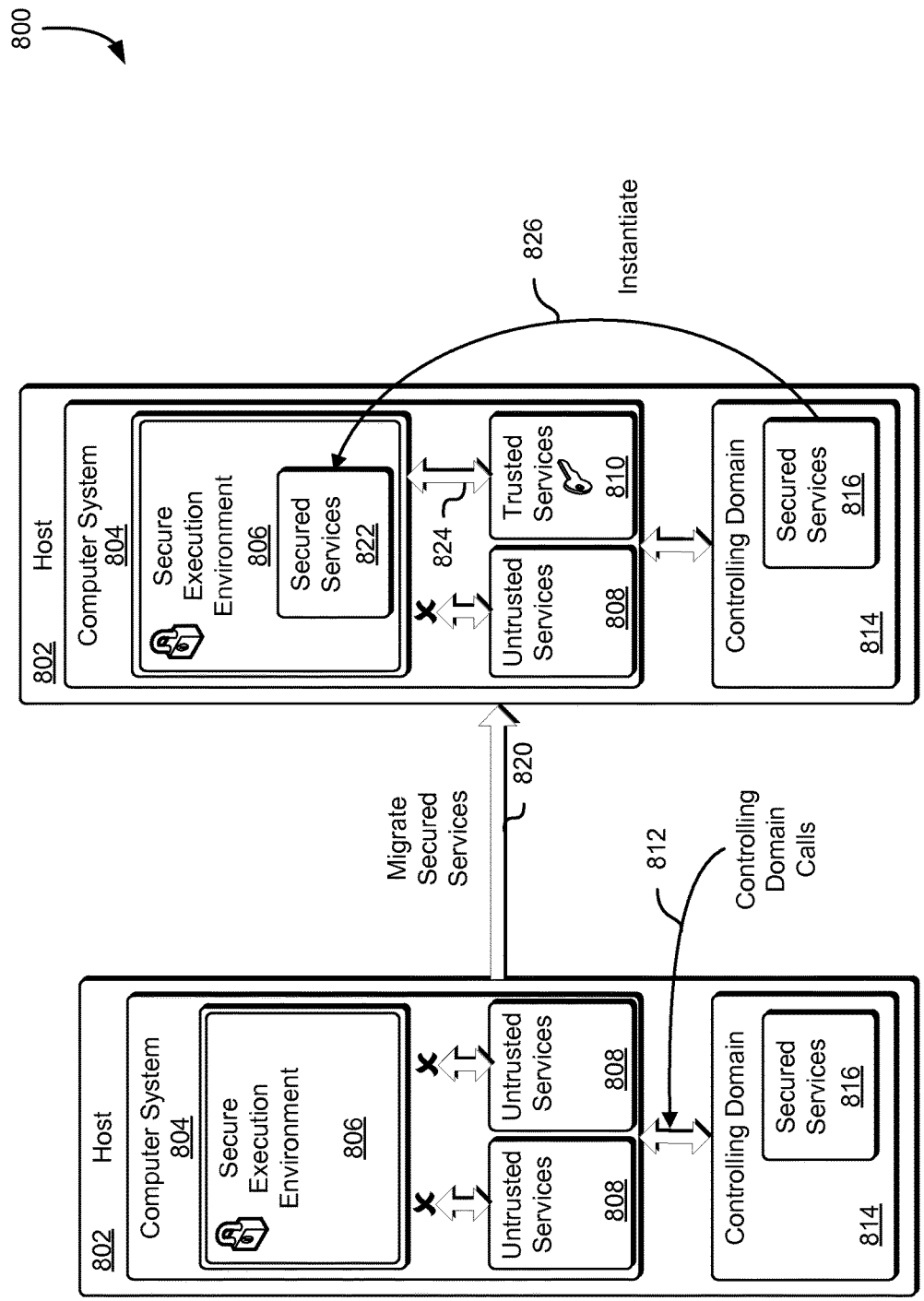
FIG. 8 illustrates an example environment where secured services may be migrated from a controlling domain in accordance with at least one embodiment.

FIG. 8 illustrates an example environment 800 where secured services may be migrated from a controlling domain to a computer system as described herein at least in connection with FIG. 2 and in accordance with at least one embodiment. A computer system 804 may be running on a host computer system 802. The computer system may contain a secure execution environment 806 and may also contain one or more untrusted services 808. The one or more untrusted services 808 may be untrusted as a result of not having possession of one or more access keys associated with the secure execution environment 806 as described herein. The one or more untrusted services 808 may be untrusted with respect to the secure execution environment 806 and may, in some embodiments, have access to one or more secured services 816 running within a controlling domain 814 such as a hypervisor operating on the host computer system 802. The controlling domain 814 may provide access to the secured services 816 via one or more controlling domain calls 812. For example, a secured service operating within a controlling domain 814 may be configured to provide secure cryptographic information which may be used by one or more services such as the untrusted services 808. The untrusted services 808 may make one or more controlling domain calls 812 to the controlling domain 814 which may then access the one or more secured services 816 to provide such cryptographic information.

As a result of receiving a command to migrate 820 the secured services from the controlling domain 814 to the secure execution environment 806, the controlling domain may instantiate 826 at least a part of the secured services 816 to run within the secure execution environment as secured services 822. In order to access the secured services 822, one or more untrusted services 808 may become one or more trusted services 810 and may replace the controlling domain calls 812 to access the secured services 816 with secure execution environment calls 824 to access the secured services 822. In some embodiments, only a portion of the secured services 816 may be migrated to the secure execution environment 806. For example, only a front-end web service may be instantiated in the secure execution environment 806. As may be contemplated, the types of secured services and the methods of instantiating those secured services within the secure execution environment as described herein are illustrative examples and other types of secured services and methods of instantiating them within the secure execution environment may be considered as within the scope of the present disclosure.

Figure 9:
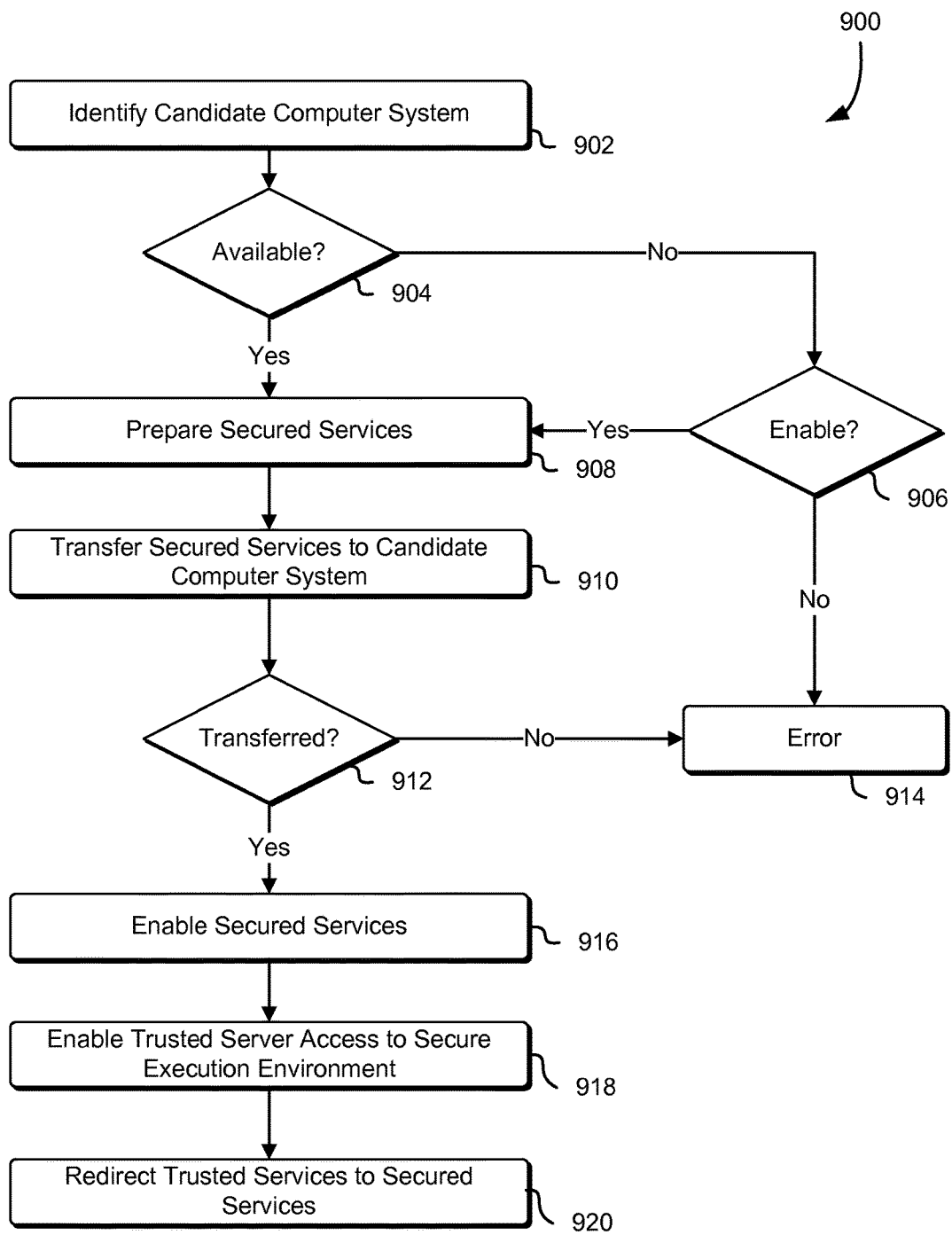
FIG. 9 illustrates an example process for migrating secure services into secure execution environments in accordance with at least one embodiment.

FIG. 9 illustrates an example process 900 for migrating secure services into secure execution environments on computer systems as described herein at least in connection with FIG. 8 and in accordance with at least one embodiment. An agent such as the agent 408 described herein at least in connection with FIG. 4 may perform at least a portion of the process illustrated in FIG. 9. A bootloader such as the bootloader 412 described herein at least in connection with FIG. 4 may perform at least a portion of the process illustrated in FIG. 9. Other entities operating with a computer system environment may also perform at least a portion of the process illustrated in FIG. 9.

To instantiate one or more secured services operating within a controlling domain to operate within a secure execution environment on a computer system, first a candidate computer system may be identified 902. The candidate computer system may be a computer system operating on a host computer system where the one or more secured services may be operating within a controlling domain (e.g., a hypervisor) as described herein at least in connection with FIG. 8 and in accordance with at least one embodiment. In some embodiments, the candidate computer system may be identified 902 based at least in part on whether there is a secure execution environment available on the candidate computer system. In some embodiments, the candidate computer system may be identified 902 based at least in part on whether a secure execution environment may be made available on the candidate computer system using, for example, one of the secure execution environment instantiation and/or configuration methods described herein.

If a secure execution environment is available 904 on the candidate computer system or if a secure execution environment may be made available 906 on the candidate computer system, at least a portion of the secured services may be prepared for instantiation within the secure execution environment 908 and those prepared secured services may be transferred to a secure execution environment on the candidate computer system 910. If it is not the case that the secured services are successfully transferred 912 or if it is not the case that a secure execution environment may be made available 906 on the candidate computer system, then an application, process, module and/or other entity configured to provide secure execution environment functionality may, in some embodiments, enter an error state 914 and may report this error state to one or more users, services, processes and/or other computer system entities. If the secured services are successfully transferred 912 then the secured services may be enabled 916 on the secure execution environment, one or more services may be granted trusted access to the secure execution environment 918 and those one or more trusted services may be redirected to use the newly instantiated secure services within the secure execution environment 920.

Figure 10:
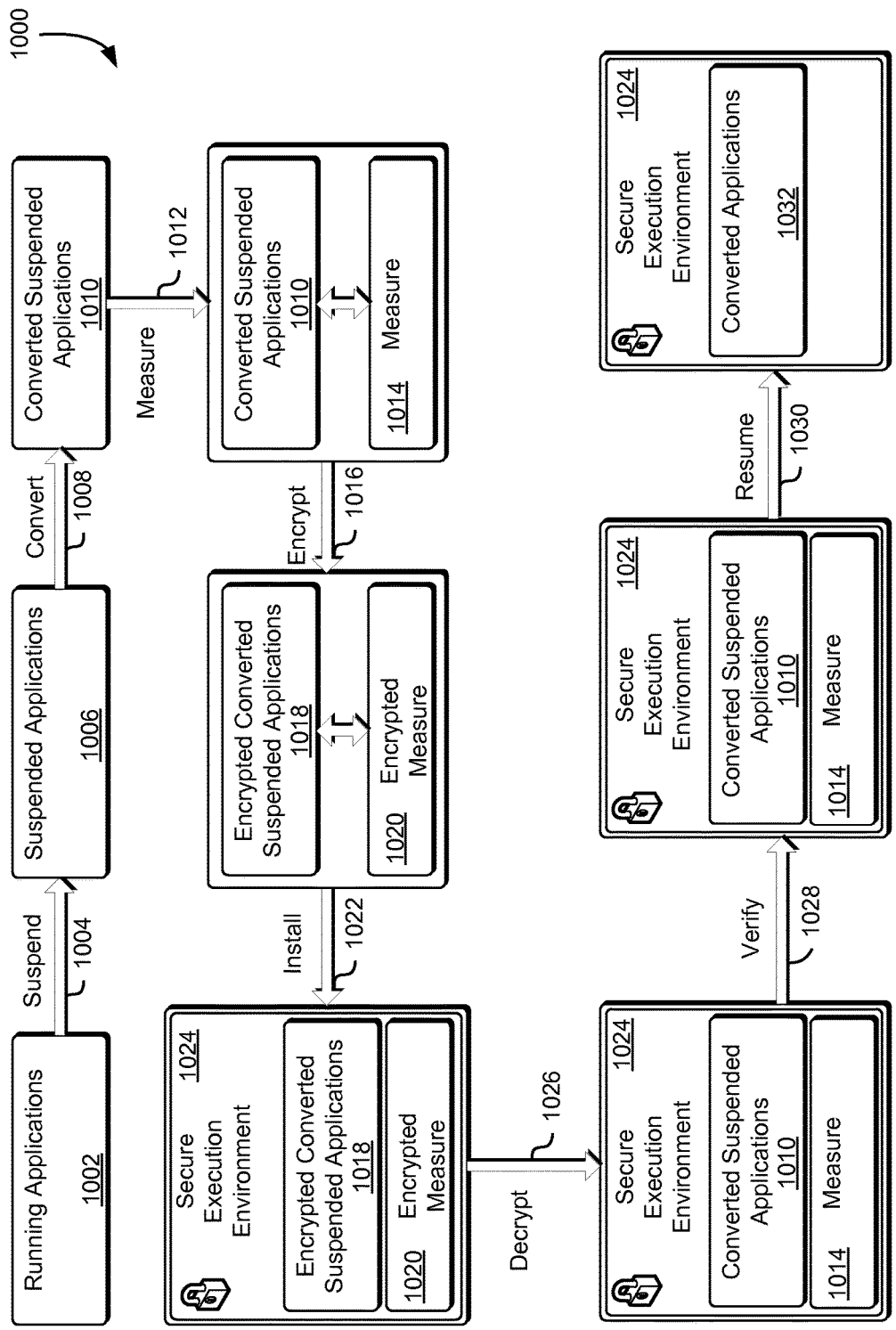
FIG. 10 illustrates an example environment where an application may be converted to run within a secure execution environment in accordance with at least one embodiment.

FIG. 10 illustrates an example environment 1000 where a running application, process, module and/or other computer system entity (as well as associated data) may be migrated into a secure execution environment as described herein at least in connection with FIG. 2 and in accordance with at least one embodiment. One or more running applications 1002 may first be suspended 1004. The running applications 1002 may include applications, processes, services, modules, and/or other computer system entities which may be operating within a computer system, within a controlling domain (e.g., a hypervisor) or within another computer system environment. For example, the running application may include a secured service such as the secured service 816 described herein at least in connection with FIG. 8 and in accordance with at least one embodiment.

The suspended applications 1006 may then be converted 1008 to run within a secure execution environment. The conversion to run within a secure execution environment may include altering data pointers, replacing API calls, replacing libraries and/or other conversion operations. The converted suspended applications 1010 may then be measured 1012 using one or more secure execution environment measurement techniques described herein and in accordance with at least one embodiment. The converted suspended applications 1010 and the measure 1014 may then be encrypted 1016 so that they may be securely installed in the secure execution environment and so that they may only be decrypted within the secure execution environment 1024. The encrypted converted suspended applications 1018 and the encrypted measure 1020 may be installed 1022 in the secure execution environment 1024 using one or more of the installation techniques described herein and in accordance with at least one embodiment.

Once in the secure execution environment 1024 the encrypted converted suspended applications 1018 and the encrypted measure 1020 may be decrypted 1026. After decryption, the converted suspended applications 1010 within the secure execution environment 1024 may be verified 1028 by, for example, once again measuring the converted suspended applications 1010 and comparing the new measure to the previous measure 1014. Such a verification may serve to ensure that the encrypted converted suspended applications 1018 and the encrypted measure 1020 that were installed 1022 in the secure execution environment 1024 were not corrupted and/or tampered with during transmission. If the converted suspended applications 1010 within the secure execution environment 1024 are verified 1028, then the converted suspended applications may be resumed 1030 to run as the converted applications 1032.

Figure 11:
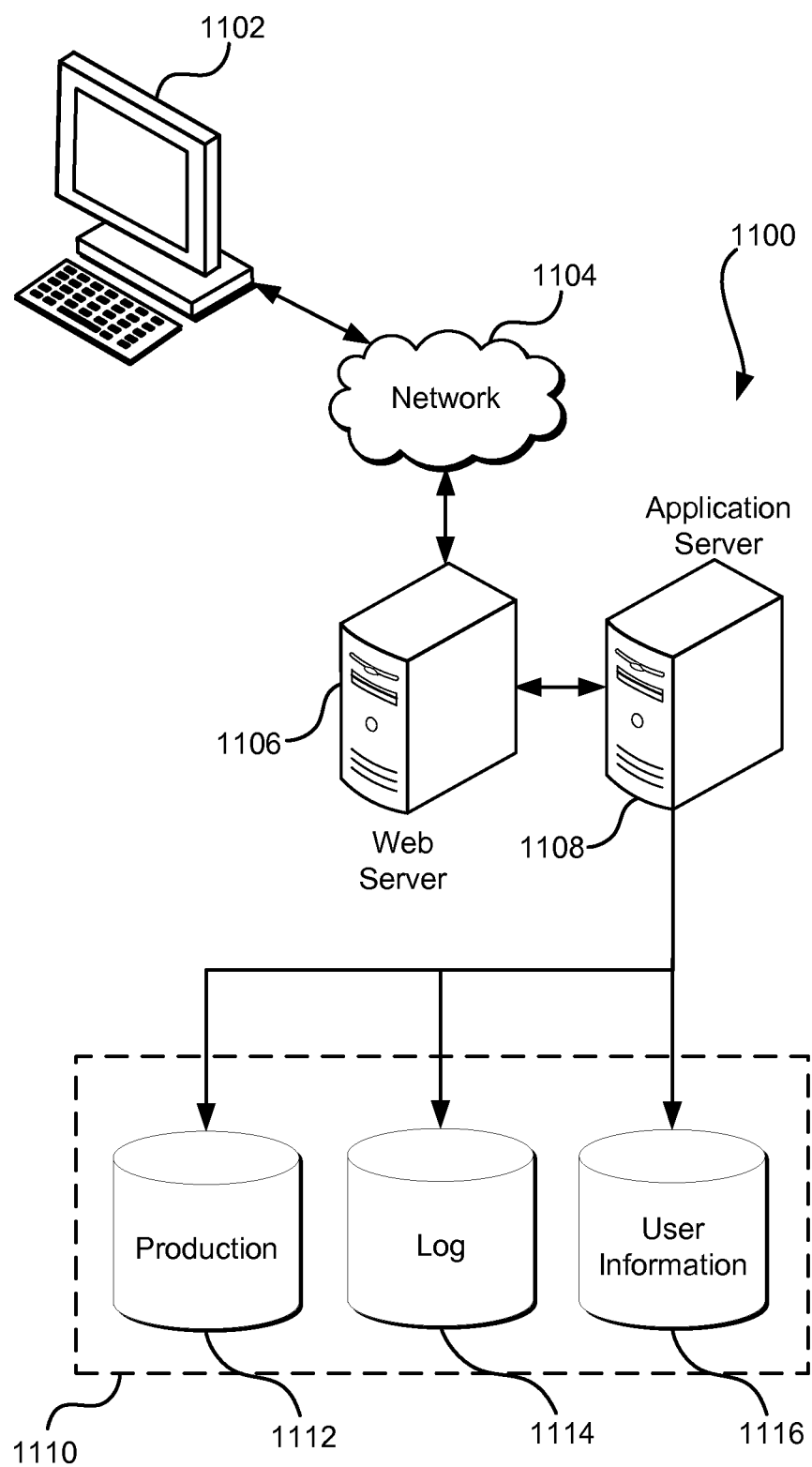
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The environment 1100, which may be a computing resource service provider environment, may be configured to provide various computing resource services to its customers individually or in a combination of services as a distributed computer system. The services provided by the computing resource service provider may include services such as virtual computer system services, block-level data storage services, cryptography services, on-demand data storage services, notification services, authentication services, policy management services, task services and/or other services. Not all embodiments described herein include all the services described and additional services may be provided in addition to or as an alternative to services explicitly described herein.

In some embodiments, the services provided by a computing resource service provider may include one or more interfaces that enable the customer to submit requests via, for example, appropriately configured API calls to the services. In addition, each of the services may include one or more service interfaces that enable the services to access each other (e.g., to enable a virtual computer system of the virtual computer system service to store data in or retrieve data from the on-demand data storage service and/or to access one or more block-level data storage devices provided by the block level data storage service). Each of the service interfaces may also provide secured and/or protected access to each other via encryption keys and/or other secured and/or protected access methods, thereby enabling secure and/or protected access between them. Collections of services operating in concert as a distributed computer system may have a single front-end interface and/or multiple interfaces between the elements of the distributed computer system.

As an example, a computing resource service provider may provide access to computer systems using a service such as a virtual computer system service that may be a collection of computer resources configured to instantiate VM instances on behalf of a customer. The customer may interact with the virtual computer system service to provision, place and operate VM instances that are instantiated on physical computer devices hosted and operated by the computing resource service provider. The VM instances may be used for various purposes, such as to operate as servers supporting a website, to operate business applications or, generally, to serve as compute power for the customer. Other applications for the VM instances may be to support database applications, electronic commerce applications, business applications, and/or other applications. In some embodiments, access to computer systems may be provided to a customer by using a system or service that does not employ virtualization or instantiation and instead provisions computer resources on dedicated or shared computers/servers and/or other physical devices.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, when executed by one or more processors of a computer system, cause the computer system to at least:
   receive a request from a first client to access a service provided by a computing resource service provider;
   instantiate a secure execution environment on a processor of the computer system, the secure execution environment being configured to enforce encryption of memory writes generated within the secure execution environment such that access to memory of the secure execution environment requires a cryptographic key protected by the secure execution environment;
   execute a bootloader within the secure execution environment, the bootloader configured with executable instructions that cause the computer system to at least:
      receive a first set of information from the computing resource service provider, the first set of information usable to instantiate a service endpoint of the service within the secure execution environment; and
      instantiate the service endpoint within the secure execution environment, the service endpoint configured to cause the computer system to fulfill one or more application programming interface requests received from one or more clients of the service; and
   fulfill an application programming interface request of the one or more application programming interface requests by, in the secure execution environment, at least:
      generating a service request based at least in part on the application programming interface request; and
      providing the service request to the service provided by the computing resource service provider.

2. The non-transitory computer-readable storage medium of claim 1, wherein the instructions further comprise instructions that, when executed by the one or more processors, cause the computer system to receive a response to the service request, the response comprising a set of executable instructions that, when executed within the secure execution environment, cause the computer system to perform one or more operations configured to fulfill the service request.

3. The non-transitory computer-readable storage medium of claim 1, wherein the instructions which cause the computer system to instantiate the service endpoint within the secure execution environment further include instructions that, when executed by the one or more processors, cause the computer system to retrieve, from the non-transitory computer-readable storage medium, a set of executable instructions that, when executed, comprise the service endpoint.

4. The non-transitory computer-readable storage medium of claim 1, wherein the instructions which cause the computer system to instantiate the service endpoint within the secure execution environment further include instructions that, when executed by the one or more processors, cause the computer system to receive, from the computing resource service provider, a set of executable instructions that, when executed, comprise at least a part of the service endpoint.

5. The non-transitory computer-readable storage medium of claim 1, wherein the first set of information from the computing resource service provider comprises a set of security credentials, at least a subset of the set of security credentials provided by the computing resource service provider.

6. The non-transitory computer-readable storage medium of claim 1, wherein the service endpoint is further configured with executable instructions to cause the computer system to at least:
receive a second set of information from the computing resource service provider;
store the second set of information in the secure execution environment;
provide, to the computing resource service provider, a cryptographic measurement of the secure execution environment; and
release the second set of information from the secure execution environment upon receiving a command from the computing resource service provider.

7. The non-transitory computer-readable storage medium of claim 6, wherein the second set of information is usable to update the service endpoint based at least in part on an update of the service.

8. The non-transitory computer-readable storage medium of claim 6, wherein the second set of information is usable to perform one or more preprocessing operations associated with the service request, the one or more preprocessing operations configured perform one or more operations associated with the service.

9. A system, comprising:
at least one computing device that:
instantiates a first secure execution environment, the first secure execution environment being configured to enforce encryption of memory writes generated within the first secure execution environment such that access to memory of the first secure execution environment requires a cryptographic key protected by the first secure execution environment;
executes a bootloader within the first secure execution environment that includes instructions that, when executed by the bootloader, implement, within the first secure execution environment, a service endpoint of a service;
receives, from a client of the service, a first request for access to the service endpoint;
performs, in the first secure execution environment, one or more operations for fulfilling the first request; and
provides, to the client, a response to the first request based at least in part on the one or more operations for fulfilling the first request.

10. The system of claim 9, wherein the at least one computing device is further configured to provide, to the client, a set of security credentials, at least a subset of the set of security credentials usable by the client to provide authentication of the service endpoint of the service.

11. The system of claim 9, wherein the at least one computing device is further configured to instantiate, within the secure execution environment, a resource monitor, the resource monitor configured to at least:
monitor, within the first secure execution environment, resource usage by the at least one computing device; and
provide information indicating the monitored resource usage.

12. The system of claim 9, wherein the one or more operations for fulfilling the first request include one or more operations to decrypt data associated with the first request using a private cryptographic key protected by the first secure execution environment, the data associated with the first request encrypted using a public cryptographic key corresponding to the private cryptographic key.

13. The system of claim 9, wherein the at least one computing device is further configured to:
instantiate a set of second secure execution environments, each second secure execution environment of the set of second secure execution environments configured to implement a respective service endpoint; and
allocate requests from clients of the service among secure execution environments of a set of secure execution environments that includes the first secure execution environment and the set of second secure execution environments.

14. The system of claim 9, wherein the one or more operations for fulfilling the first request include:
validate a cryptographic measurement generated within the first secure execution environment; and
provide data for performing the one or more operations for fulfilling the first request on a condition that validation of the cryptographic measurement is successful.

15. A computer-implemented method comprising:
under the control of one or more computer systems of a computing resource service provider, the one or more computer systems configured with executable instructions,
implementing, by a bootloader executing within a secure execution environment, a service endpoint of a service provided by the computing resource service provider, the secure execution environment being configured to enforce encryption of memory writes generated within the secure execution environment such that access to memory of the secure execution environment requires a cryptographic key protected by the secure execution environment;
receiving, from a client, a request for access to the service endpoint; and
fulfilling the request by executing, within the secure execution environment, a set of executable instructions based at least in part on the request for access to the service endpoint.

16. The computer-implemented method of claim 15, wherein the set of executable instructions includes one or more executable instructions that, when executed within the secure execution environment, perform one or more preprocessing operations of the service.

17. The computer-implemented method of claim 15, wherein the method further comprises selecting the service endpoint from a plurality of service endpoints each within a respective secure execution environment.

18. The computer-implemented method of claim 15, wherein fulfilling the request comprises providing data to the service endpoint, the data being encrypted to be decryptable using a cryptographic key that is inaccessible outside of the secure execution environment.

19. The computer-implemented method of claim 15, wherein the set of executable instructions includes one or more executable instructions that, when executed within the secure execution environment, provide a secure network connection between the client and the computing resource service provider.

20. The computer-implemented method of claim 15, wherein the set of executable instructions includes one or more executable instructions that, when executed within the secure execution environment, provide access by the client to data storage provided by the computing resource service provider.

* * * * *